(12) United States Patent
Matoba

(10) Patent No.: US 7,729,250 B2
(45) Date of Patent: Jun. 1, 2010

(54) BANDWIDTH CONTROL DEVICE AND BANDWIDTH CONTROL METHOD

(75) Inventor: Kazumine Matoba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 11/788,203

(22) Filed: Apr. 19, 2007

(65) Prior Publication Data

US 2008/0101406 A1    May 1, 2008

(30) Foreign Application Priority Data

Oct. 30, 2006    (JP) .............................. 2006-293733

(51) Int. Cl.
H04L 12/26    (2006.01)

(52) U.S. Cl. .................................. 370/230.1

(58) Field of Classification Search ........................ None
See application file for complete search history.

(56) References Cited

U.S. PATENT DOCUMENTS

| 5,757,772 | A | * | 5/1998 | Thornberg et al. .......... 370/236 |
| 6,377,548 | B1 | | 4/2002 | Chuah |
| 6,721,797 | B1 | * | 4/2004 | Kim ........................... 709/232 |
| 6,910,063 | B1 | * | 6/2005 | Ramanathan et al. ....... 709/203 |
| 7,023,799 | B2 | | 4/2006 | Takase et al. |
| 2003/0123390 | A1 | | 7/2003 | Takase et al. |
| 2006/0222008 | A1 | * | 10/2006 | Aaron et al. ................. 370/468 |

FOREIGN PATENT DOCUMENTS

| JP | 11-298532 | 10/1999 |
| JP | 2003-198611 | 7/2003 |

\* cited by examiner

*Primary Examiner*—Steven H Nguyen
*Assistant Examiner*—Alex Skripnikov
(74) *Attorney, Agent, or Firm*—Katten Muchin Roseman LLP

(57) ABSTRACT

It is an object to increase a processing-enabled user count and traffic size by avoiding frames from being discarded without any increase in buffer size within a bandwidth control device. A bandwidth control device includes a response measuring module measuring a size of a response frame and calculating, based on the measured size, a predictive traffic size as a size of the traffic of the response frame predicted to be received as a response to a request frame, and a bandwidth control module controlling a traffic rate of the response frame corresponding to the request frame by controlling a traffic rate of the request frame on the basis of the calculated predictive traffic size.

20 Claims, 23 Drawing Sheets

| FLOW NUMBER | COUNTER VALUE (BYTES) |
|---|---|
| 1 | 4000 |
| 2 | 0 |
| 3 | 0 |

FIG. 15

| FLOW NUMBER | PROCESSING TARGET FLAG |
|---|---|
| 1 | ENABLE (1) |
| 2 | DISABLE (0) |
| 3 | DISABLE (0) |

| FLOW NUMBER | COUNTER VALUE |
|---|---|
| 1 | 1900KB |
| 2 | 0 |
| 3 | 0 |

FIG. 23

| CONTENT IDENTIFIER | | | FLOW NUMBER | ESTIMATION SIZE |
|---|---|---|---|---|
| URL | SERVER IP ADDRESS | CLIENT IP ADDRESS | | |
| http://www.xxxx.com/index.htm | 10.0.0.1 | 20.0.0.1 | 1 | 100KB |
| http://www.xxxx.com/index2.htm | 10.0.0.1 | 20.0.0.2 | 1 | 100KB |
| http://www.xxxx.com/index3.htm | 10.0.0.1 | 20.0.0.3 | 1 | 100KB |

BANDWIDTH CONTROL DEVICE AND BANDWIDTH CONTROL METHOD

BACKGROUND OF THE INVENTION

The present invention relates to a bandwidth control device that relays traffic in a way that receives and transits frames in bidirectional flows of traffic and to a bandwidth control method.

There exists a bandwidth control device configured to prevent the traffic exhibiting a high degree of importance from being delayed or discarded by temporarily storing relay target traffic (frames) in a buffer (queue) within the device and performing bandwidth control such as committed information rate (CIR) and priority control on the occasion of reading the frames from the buffer and then transmitting the frames.

In the bandwidth control device, each of flows is identified when receiving the frames from a server, and the buffer is allocated according to every flow on the basis of a preset relay priority level. Herein, if the traffic (frames) arrives in a bursting manner, a shaping function works as a function for averaging transmission rates. The shaping function is a function of buffering the frames over a set output rate in the buffers within the device. Further, an output rule from the buffer involves using the methods such as the committed information rate (CIR) and the priority control.

A technology (refer to Patent document 1) related to the bandwidth control function for, e.g., a variable-length packet exists as this type of conventional technology. Moreover, there is a technology (refer to Patent document 2) that permits a new connection based on a measured traffic size (an amount of traffic) in a multiple access system.

[Patent document 1] Japanese Patent Application Laid-Open Publication No. 2003-198611

[Patent document 2] Japanese Patent Application Laid-Open Publication No. 11-298532

SUMMARY OF THE INVENTION

A general type of enterprise network takes such a configuration that a LAN (Local Area Network) has a broad bandwidth, while a WAN (Wide Area Network) has a narrow bandwidth. In the case of performing communications across these networks, congestion occurs due to a difference between the bandwidths at an ingress via which to enter the WAN from the LAN, such a problem arises that a delay or discarding occurs in the traffic concerning an operation having a high degree of importance and VoIP-based traffic etc.

An approach to this problem involves utilizing a network device having a bandwidth control function (which will hereinafter be referred to as a [bandwidth control device]) (see FIGS. 1 and 2). In the case of introducing the bandwidth control device along a system design, to begin with, a traffic size at a peak time is estimated from a prospective user count and a content size. Based on a result of this estimation, a network bandwidth capable of bearing the traffic size at the peak time is prepared, and it follows that the bandwidth control device having a buffer size matching with this bandwidth is introduced.

After introducing the system including the server and the bandwidth control device, however, such a problem arises that if the number of users utilizing the system increases and if the traffic is transmitted from the server at a rate causing an overflow of the buffer provided in the bandwidth control device, the communications (traffic) between a client and the server are interrupted due to the discarding of the frames, resulting in occurrence of timeout (see FIGS. 3 and 4).

Herein, if the buffer size is increased up to a capacity including the traffic for the increased number of users, the frames can be avoided from being discarded, however, the buffer size of the bandwidth control device is normally fixed, and generally an extension of memory for increasing the buffer size can not be done. Further, even if the extension of memory can be attained, a problem lies in a high cost for components of the memory.

It is an object of the present invention to, in view of the problems given above, increase a processing-enabled user count and traffic size by avoiding the frames from being discarded without any increase in buffer size within the bandwidth control device.

According to the present invention, a solution for the problems involves performing indirect traffic rate control of the response traffic by controlling the forwarding of the request on the basis of a result of estimating a response traffic size predicted to occur with respect to the request (see FIG. 5).

Specifically, the present invention is a bandwidth control device comprising: frame retaining unit retaining, in the reception frames, a request frame defined as a data transmission request to another processing device; response measuring unit measuring a size of the response frame, in the reception frames, containing data transmitted from another processing device upon receiving the data transmission request, and calculating, based on the measured size, a predictive traffic size defined as a size of the traffic of the response frame predicted to be received as a response to the request frame; and bandwidth control unit controlling a frame traffic rate in a way that changes timing of reading the frame from the frame retaining unit, and performing, based on the predictive traffic size calculated by the response measuring unit, traffic rate control of indirectly controlling a traffic rate of a response frame corresponding to the request frame by adjusting transmission timing of the request frame retained in the frame retaining unit and by controlling the traffic rate of the request frame.

According to the present invention, the calculation of the predictive traffic size enables the indirect control of the traffic rate of the response frame by controlling the traffic rate of the request frame. A size of the response frame containing the requested data is normally larger than a size of the request frame, and hence the larger traffic can be controlled with a smaller amount of consumption of a buffer.

Namely, according to the present invention, it is possible to deal with a much larger user count and a much greater traffic size than those of the conventional bandwidth control device with the same buffer size as of the conventional bandwidth control device, and to prevent a delay or discarding due to congestion.

It should be noted that the calculating unit of the predictive traffic size is exemplified by a method of calculating an average value and a median of the traffic sizes occurred with respect to one request frame by collecting sizes of measurement target response frames. Further, in the case of scheming to enhance accuracy of the predictive traffic size, there may be calculated the average value of the response traffic sizes on the unit of a requested URL and an individual size of a content located on the server.

Moreover, according to the present invention, the bandwidth control device may further comprising traffic rate measuring unit measuring a traffic size of the response frame, wherein the bandwidth control unit may start the traffic rate control when the traffic size exceeding a predetermined value is measured under the traffic rate control.

The traffic rate control is started when the traffic size exceeds the predetermined value, thereby making it possible to start the traffic rate control according to the present invention at the proper timing when the necessity arises while performing the conventional traffic rate control at a normal time.

Further, the frame retaining unit may notify the bandwidth control unit of buffer information defined as information about a size of the frame retained by the frame retaining unit, and the bandwidth control unit may finish the traffic rate control when the size of the frame retained by the frame retaining unit, which is indicated by the buffer information of which the frame retaining unit has notified, is equal to or smaller than a predetermined threshold value.

With this configuration being taken, the traffic rate control can be dynamically finished corresponding to a state of the frame retaining unit. Herein, the buffer information to be notified may be only the buffer information in the frame retaining unit related to the request traffic, however, both of the buffer information related to the request traffic and the buffer information related to the response traffic may also be notified.

When judging that the buffer related to the request traffic has an unused area and when terminating the traffic rate control, there might be a possibility of causing an overflow of the buffer related to the response traffic with the response frames to the already-transmitted request frame. Occurrence of such a state can be prevented by judging termination timing of the traffic rate control on the basis of a frame size indicated by both of the buffer information related to the request traffic and the buffer information related to the response traffic.

Moreover, according to the present invention, the bandwidth control device may further comprise control target flow retaining unit retaining, together with flow identifying information, information representing enable or disable of the traffic rate control for every flow defined as a combination of the request frame and a response frame corresponding to the request frame in the reception frames, wherein the traffic rate measuring unit may search for, based on the flow identifying information, the information representing the enable or disable of the traffic rate control that is retained by the control target flow retaining unit with respect to the flow related to the received frames, and, if the traffic rate control is disabled, may not give the instruction of starting the traffic rate control.

The present invention is characterized by performing the traffic rate control described above, and hence it follows that a tremendous amount of traffic can be indirectly controlled with a smaller amount of buffers as the traffic has the larger size of the response to the request, whereby a great effect is obtained by applying the present invention.

Namely, with the configuration described above being provided, the enable/disable of the traffic rate control is judged for every specified flow, and it is feasible to apply the traffic rate control to only the specified flow exhibiting the great effect obtained by applying the present invention.

Still further, the frame retaining unit may retain the response frame in the reception frames, and the bandwidth control device may further comprise buffer monitoring unit monitoring a usage state of the frame retaining unit by periodically acquiring the buffer information defined as the information about the size of the frame retained by the frame retaining unit, and, if the frame size indicated by the buffer information exceeds a predetermined threshold value, instructing the bandwidth control unit to start the traffic rate control.

According to the present invention, the traffic rate control is conducted by the conventional method till the size of the frames retained by the frame retaining unit exceeds the predetermined threshold value, and, when the frame size exceeds the predetermined threshold value, the traffic rate control described above is started, whereby the buffer of the frame retaining unit can be effectively employed.

Yet further, the bandwidth control device may further comprise request identifying unit identifying as to whether the reception frame is the request frame or not, then getting the reception frame retained by the frame retaining unit when the reception frame is the request frame, and transmitting the reception frame without getting the reception frame retained by the frame retaining unit when the reception frame is not the request frame.

According to the present invention, a memory capacity utilized for the buffer of the frame retaining unit and a CPU usage quantity for the traffic rate control can be reduced by targeting the traffic rate control at only the request frame.

Furthermore, the bandwidth control device may further comprise not-yet-respond size retaining unit retaining, in the response frames corresponding to the received request frame, a total predictive traffic size of the not-yet-received response frames; predictive traffic size adding unit adding the predictive traffic size corresponding to the received request frame to the not-yet-respond size retaining unit; and response traffic size subtracting unit subtracting, when sending the response frame corresponding to the request frame, the traffic size of the response frame from the not-yet-respond size retaining unit, wherein the frame retaining unit may retain the response frame in the reception frames, and the bandwidth control unit may compare the total predictive traffic size with a free area capacity of the frame retaining unit, and may adjust, based on a result of the comparison, transmission timing of the request frame retained by the frame retaining unit, thus performing the traffic rate control.

The total predictive traffic size is a total size of the traffic related to the response frames predicted to be received hereafter at a certain point of time. An excess of this total predictive traffic size over a free capacity of the frame retaining unit at that point of time connotes a high possibility of causing the overflow of the buffer of the frame retaining unit.

Namely, with the configuration described above being provided, the total predictive traffic size is compared with the free capacity of the frame retaining unit, and it is possible to take a measure such as stopping the forwarding of the request frame or decreasing a forwarding rate of the request frame when the predictive traffic size exceeds the free capacity of the frame retaining unit.

According to the configuration described above, however, the traffic size added to the not-yet-respond size retaining unit is the predictive traffic size, and the traffic size to be subtracted is the actual response traffic size. In this case, an error occurs in the total predictive traffic size stored in the not-yet-respond size retaining unit. Therefore, the bandwidth control device according to the present invention may take the following configuration.

Namely, the bandwidth control device further comprises: not-yet-respond size retaining unit retaining, in the response frames corresponding to the received request frame, a total predictive traffic size of the not-yet-received response frames; predictive traffic size adding unit adding the predictive traffic size corresponding to the received request frame to the not-yet-respond size retaining unit; predictive traffic size retaining unit retaining the predictive traffic size corresponding to the received request frame for every flow defined as a combination of the request frame and a response frame corresponding to the request frame; and predictive traffic size subtracting unit acquiring a predictive traffic size corresponding to the response frame to be transmitted from the predictive traffic size per flow that is retained by the predictive traffic size retaining unit when transmitting the response frame corresponding to the request frame, and subtracting the acquired predictive traffic size from the not-yet-respond size retaining unit, wherein the frame retaining unit retains the response frame in the reception frames, and the bandwidth control unit compares the total predictive traffic size with a free area capacity of the frame retaining unit, and adjusts, based on a result of the comparison, transmission timing of the request frame retained by the frame retaining unit, thus performing the traffic rate control.

With the configuration described above being provided, it follows that the predictive traffic size added to the not-yet-respond size retaining unit is subtracted by an amount of addition because of receiving the corresponding request frame. Namely, the occurrence of the error described earlier can be prevented.

Moreover, the present invention can be grasped as a method executed by a computer, or a program for making the computer function as the respective unit. Further, the present invention may also be a recording medium recorded with such a program that can be read by the computer and other devices, machines, etc. Herein, the recording medium readable by the computer, etc. connotes a recording medium capable of storing information such as data and programs electrically, magnetically, optically, mechanically or by chemical action, which can be read from the computer etc.

EFFECTS OF THE INVENTION

According to the present invention, it is possible to increase a processing-enabled user count and traffic size by avoiding the frames from being discarded without any increase in buffer size within the bandwidth control device.

BRIEF DESCRIPTION OF THE DRAWINGS

FIG. 15 is a diagram illustrating an outline of a structure of an entry retaining an enable/disable flag of the traffic rate control per flow in the embodiment.

FIG. 22 is a diagram showing an example of a structure of a not-yet-respond size counter in the embodiment.

FIG. 23 is a diagram showing an example of a structure of request identifying information retained by a predictive traffic size retaining module in the embodiment.

DETAILED DESCRIPTION OF THE INVENTION

Figure 1:
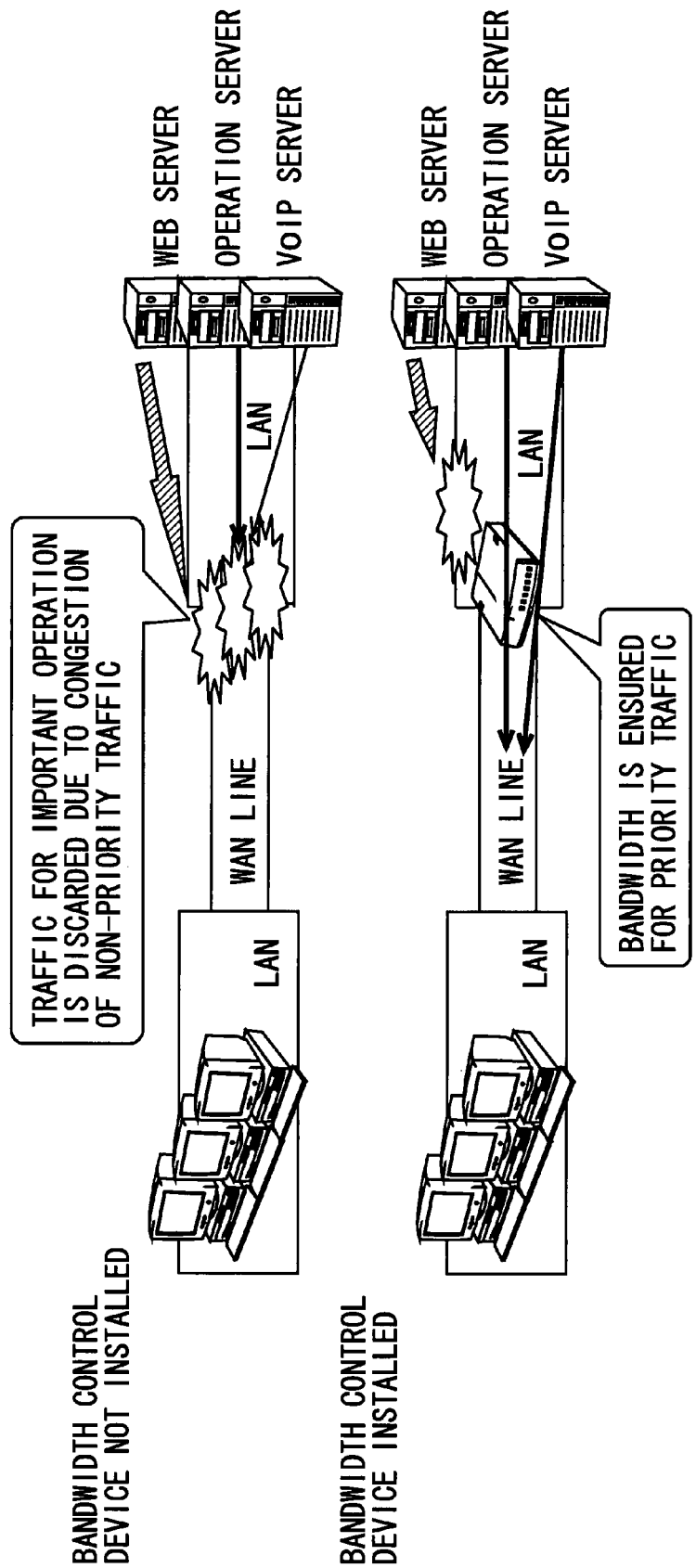
FIG. 1 is a diagram showing an example of employing a bandwidth control device.
Figure 2:
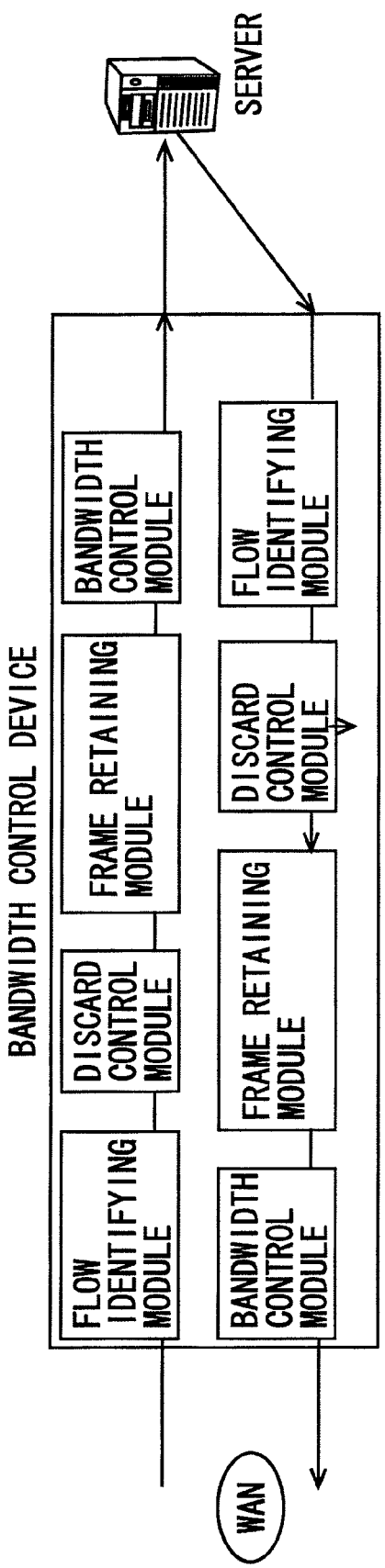
FIG. 2 is a diagram showing a configuration of the bandwidth control device in the conventional technology.
Figure 3:
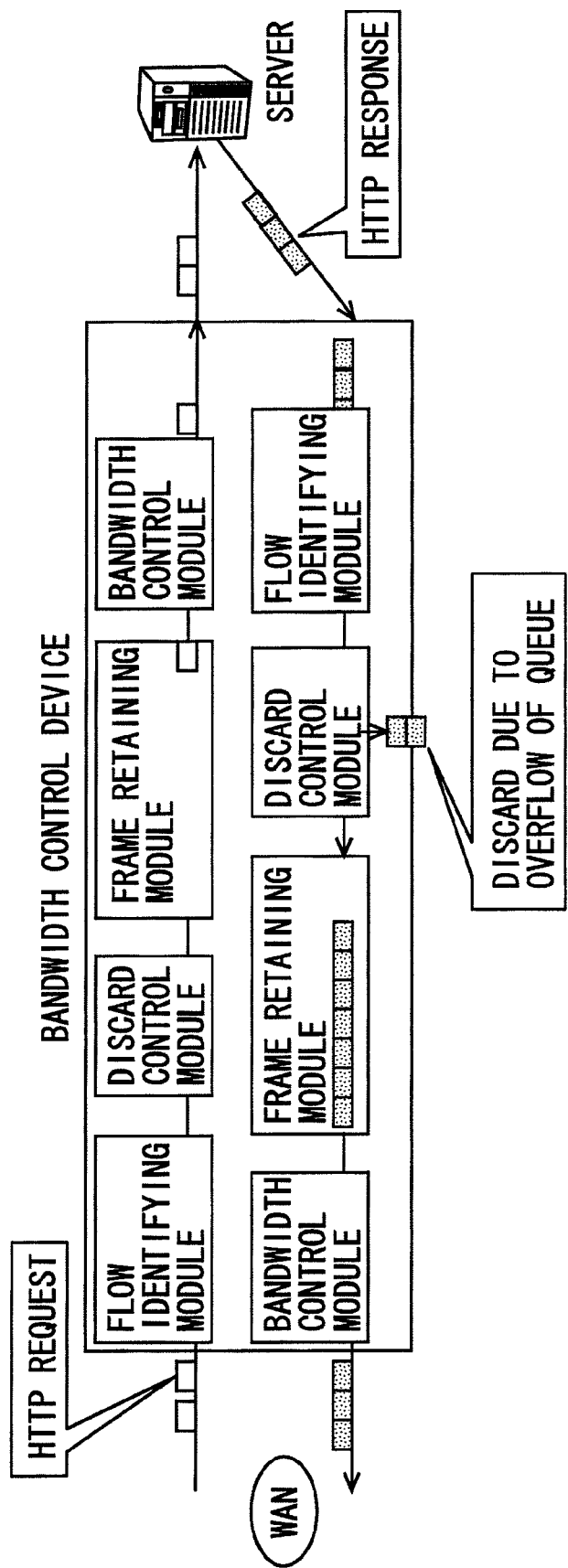
FIG. 3 is a diagram illustrating a state when a frame is discarded in the conventional technology.
Figure 4:
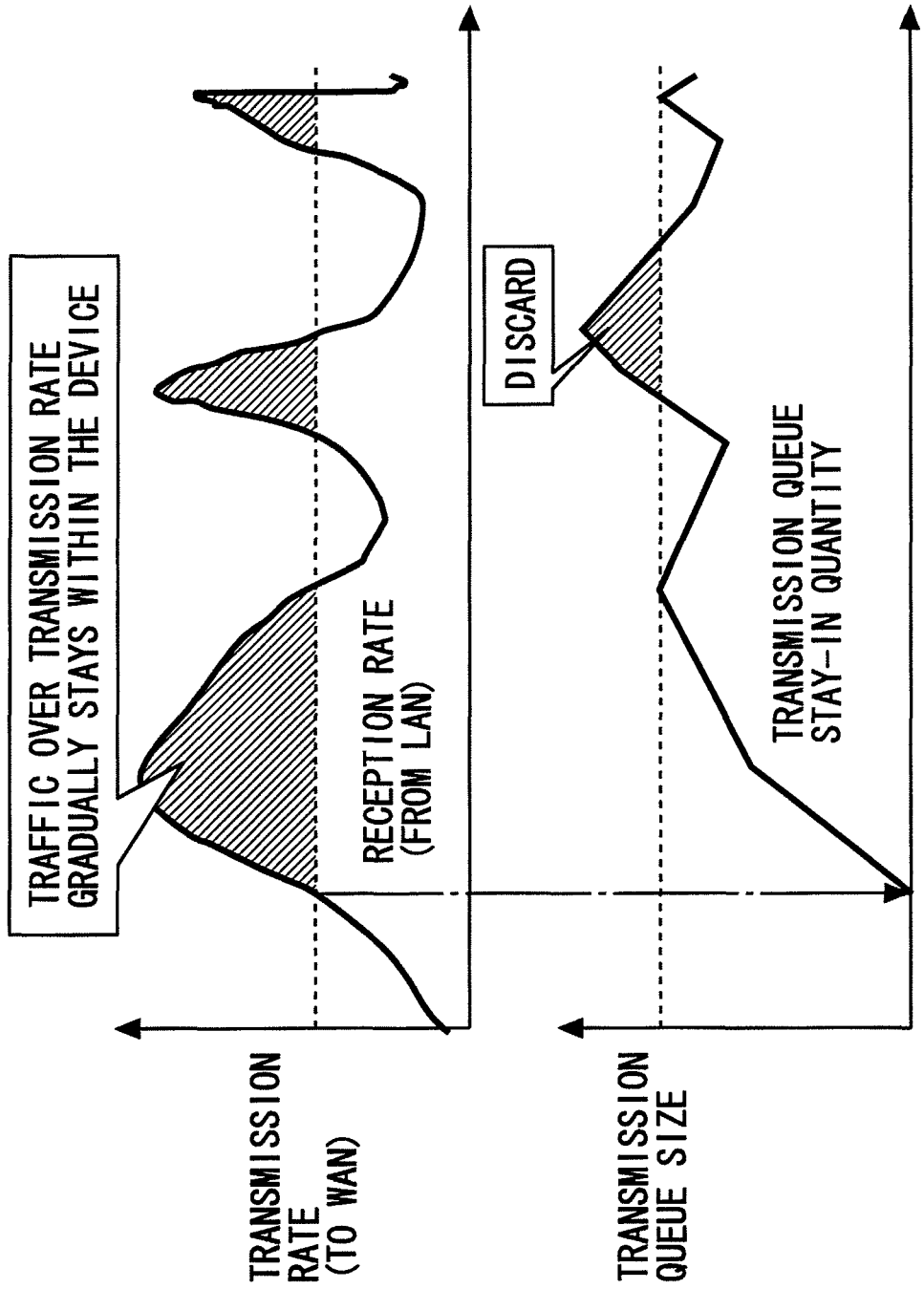
FIG. 4 is a graph showing a state where the frame is discarded in the conventional technology.
Figure 5:
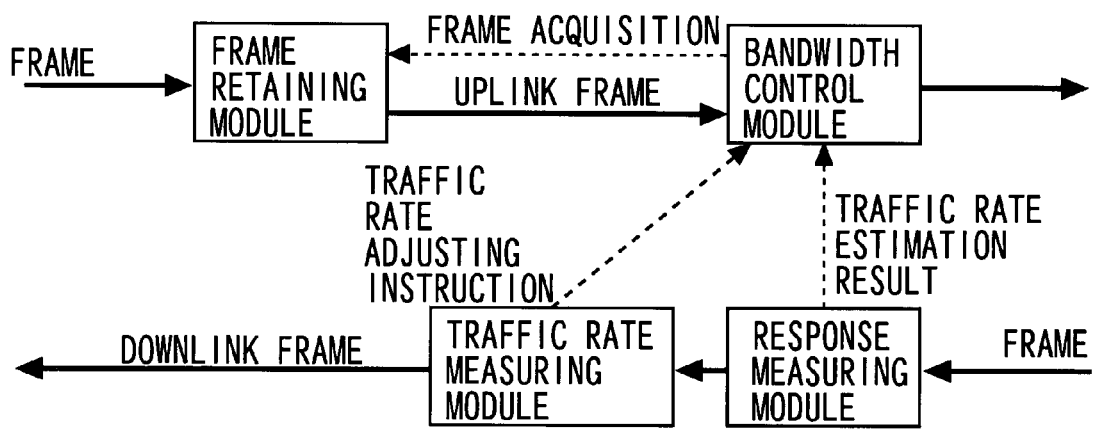
FIG. 5 is a diagram showing a configuration in principle according to the present invention.
Figure 6:
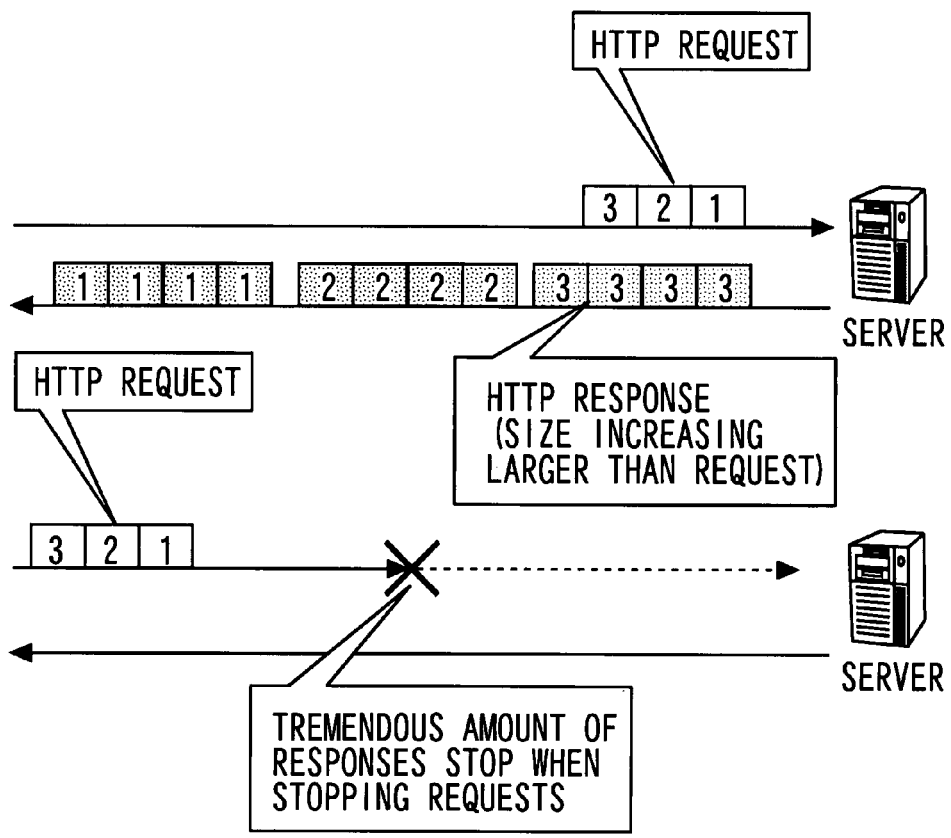
FIG. 6 is a diagram showing a characteristic of traffic in an embodiment.

Embodiments of a bandwidth control device and a bandwidth control method according to the present invention will hereinafter be described with reference to the drawings. The present embodiments will exemplify a case of conducting QoS (Quality of Service) control targeted at HTTP (HyperText Transfer Protocol) traffic. The HTTP traffic generally has an extremely large size of a response message for a size of a request message, and can therefore restrict a tremendous flow of response traffic by blocking the request messages (see FIG. 6).

The target of the present invention is not, however, limited to the HTTP traffic but can be applied to other types of traffic conditional on performing request/response model communications having the characteristics described above.

First Embodiment

Figure 7:
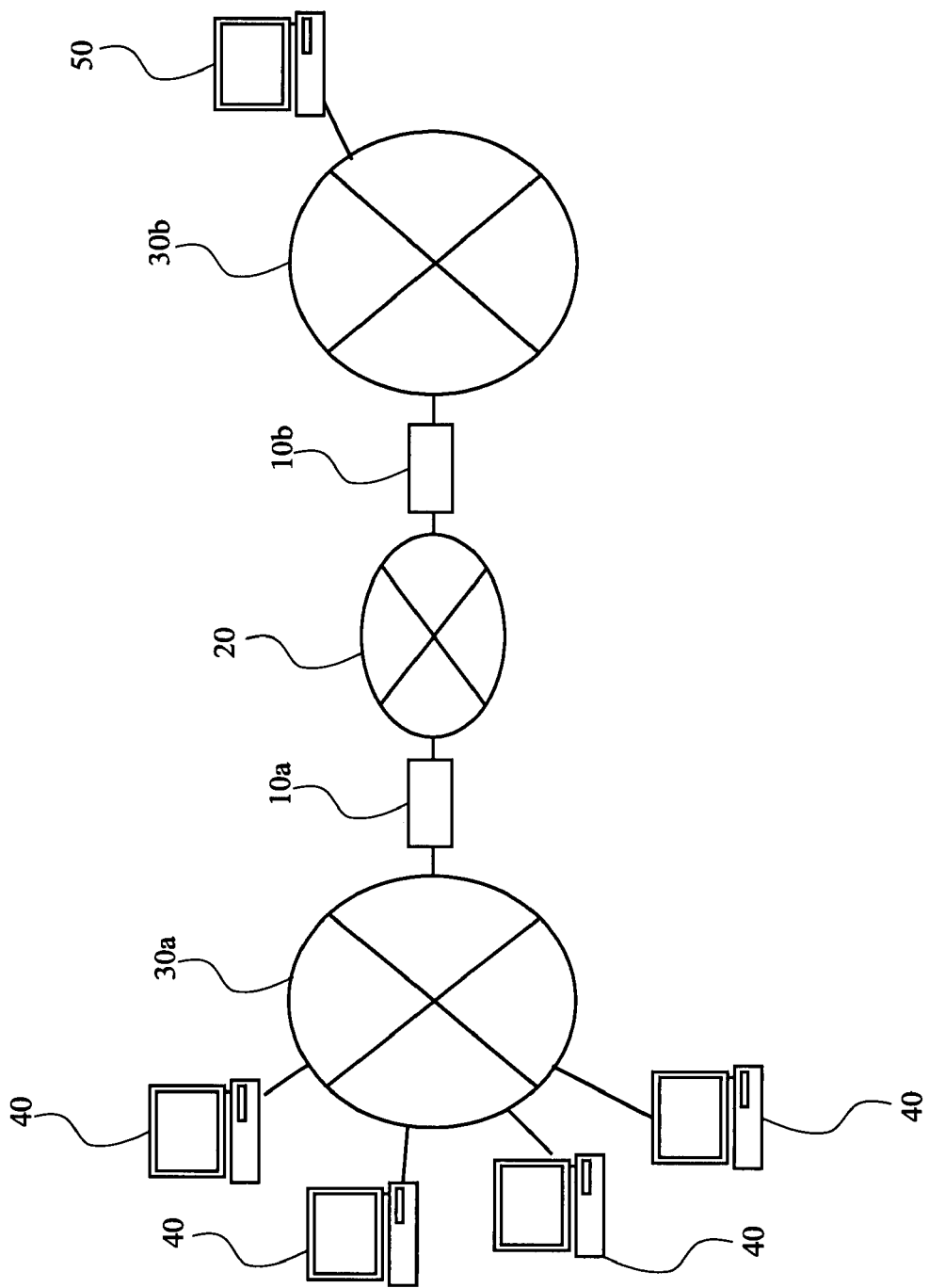
FIG. 7 is a diagram showing an outline of a network configuration in the embodiment.

FIG. 7 is a diagram showing an outline of a network configuration in a first embodiment. A client 40 and a server 50 are connected respectively to different LANs 30a and 30b, wherein the LAN 30a (which will hereinafter be termed a site LAN) 30a to which the client 40 belongs and the LAN (which will hereinafter be referred to as a data center LAN) 30b to which the server 50 belongs, are connected to each other via a WAN 20. Gateways 10a, 10b are situated between the LAN 30a and the WAN 20 and between the LAN 30b and the WAN 20. The gateways 10a, 10b relay the communications (traffic)

between the LAN 30a and the WAN 20 and the communications (traffic) between the LAN 30b and the WAN 20, which are different in terms of a communication method, a communication speed, etc. The gateway 10b situated between the WAN 20 and the data center LAN 30b functions as a bandwidth control device 10b according to the present invention. It should be noted that in flows of traffic (communications) relayed by the bandwidth control device 10b in the first embodiment, the traffic (frames) addressed to a terminal (which is mainly the server 50) in the data center LAN 30b is called uplink traffic, while the traffic (frames) addressed to a terminal (which is mainly the client 40) in the site LAN 30a is called downlink traffic.

Normally, the LAN 30b is broader in bandwidth than the WAN 20. Therefore, when a tremendous amount of frames are transmitted toward the WAN 20 from the LAN 30b, congestion occurs in the gateway 10b, and it happens that the frames are discarded, and so on. A scheme in the first embodiment is that the bandwidth of the LAN 30b is set to 1 Gbps (Giga bits per second) and the bandwidth of the WAN 20 is set to 100 Mbps (Mega bits per second).

Figure 8:
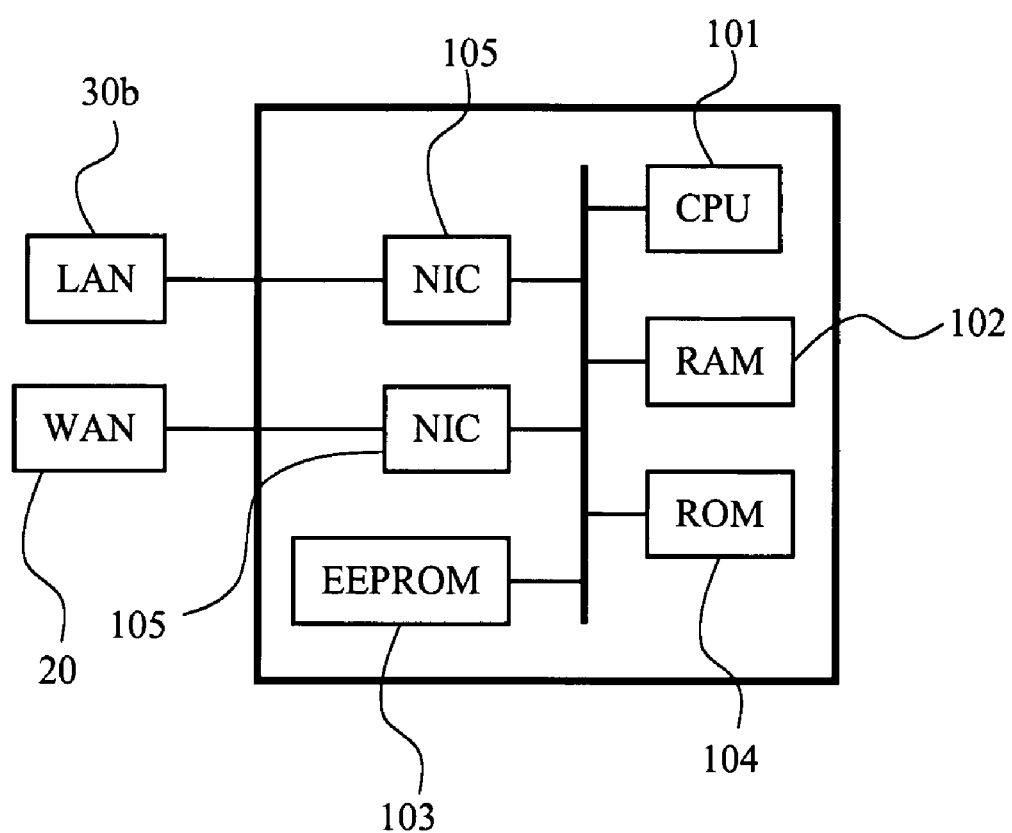
FIG. 8 is a diagram showing an outline of a hardware configuration of the bandwidth control device in the embodiment.

FIG. 8 is a diagram showing an outline of a hardware configuration of the bandwidth control device 10b in the first embodiment. The bandwidth control device 10b includes a CPU (Central Processing Unit) 101, a RAM (Random Access Memory) 102, an EEPROM (Electrically Erasable and Programmable Read Only Memory) 103, a ROM (Read Only Memory) 104, a NIC (Network Interface Card) 105, etc. which are connected to each other via a bus.

The CPU 101 is the central processing unit that controls the RAM 102, the EEPROM 103, the NIC 105, etc by processing commands and data developed on the RAM 102 etc. The RAM 102 is a main memory, controlled by the CPU 101, to and from which various categories of, commands and data are written and read. The EEPROM 103 is an auxiliary memory to and from which want-to-retain information is written and read even when mainly the bandwidth control device 10b is powered off. The NIC 105 is a network interface that receives signals from the LAN 30b or the WAN 20 and transmits the signals to LAN 30b or the WAN 20.

Figure 9:
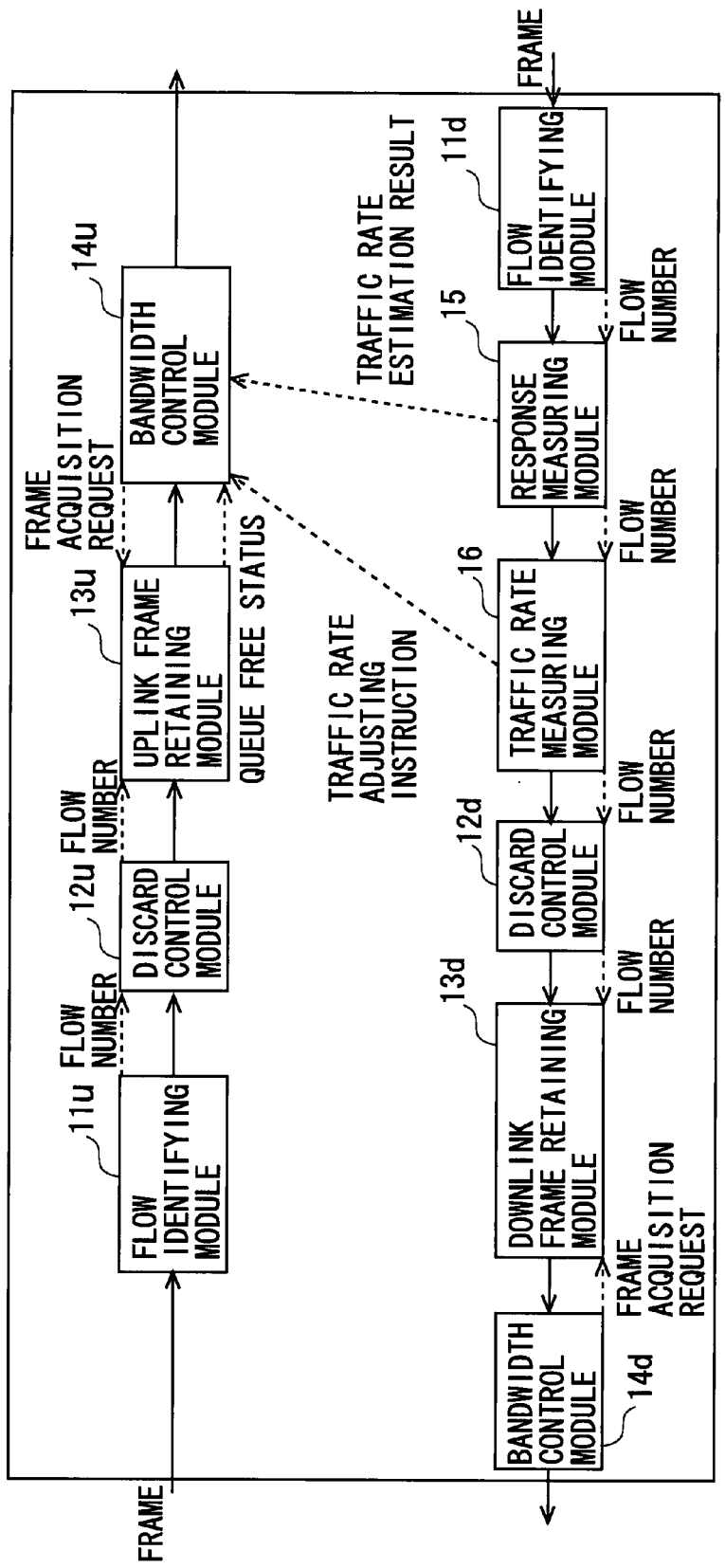
FIG. 9 is a diagram showing an outline of a processing flow of a reception frame by each of functions provided in the bandwidth control device in the embodiment.

FIG. 9 is a diagram showing an outline of a flow of processing a reception frame by each of functions provided in the bandwidth control device 10b in the first embodiment. The CPU 101 executes the programs developed on the RAM 102 or the ROM 104, whereby the bandwidth control device 10b functions as the device including flow identifying modules 11u, 11d, discard control modules 12u, 12d, uplink/downlink frame retaining modules 13u, 13d, bandwidth control modules 14u, 14d, a response measuring module 15 and a traffic rate measuring module 16.

Each of the flow identifying modules 11u, 11d specifies a flow on the basis of header information (e.g., a source IP address, a destination IP address, etc) of the reception frame, and determines a flow number. Herein, it is assumed that an associative relationship of associating the header information and the flow number with each other be previously set up by an administrator. A scheme in the first embodiment is that all of the frames of which the source or destination address is the server 50 are attached with a flow number "1".

The discard control modules 12u, 12d acquire the frame number and the flow number from the flow identifying modules 11u, 11d, then check a queue status specified by the corresponding flow number within the frame retaining modules 13u, 13d, and, if there free areas, transfer the reception frames to the frame retaining modules 13u, 13d. Whereas if there is no free area, the reception frames are discarded.

Figures 10, 11:
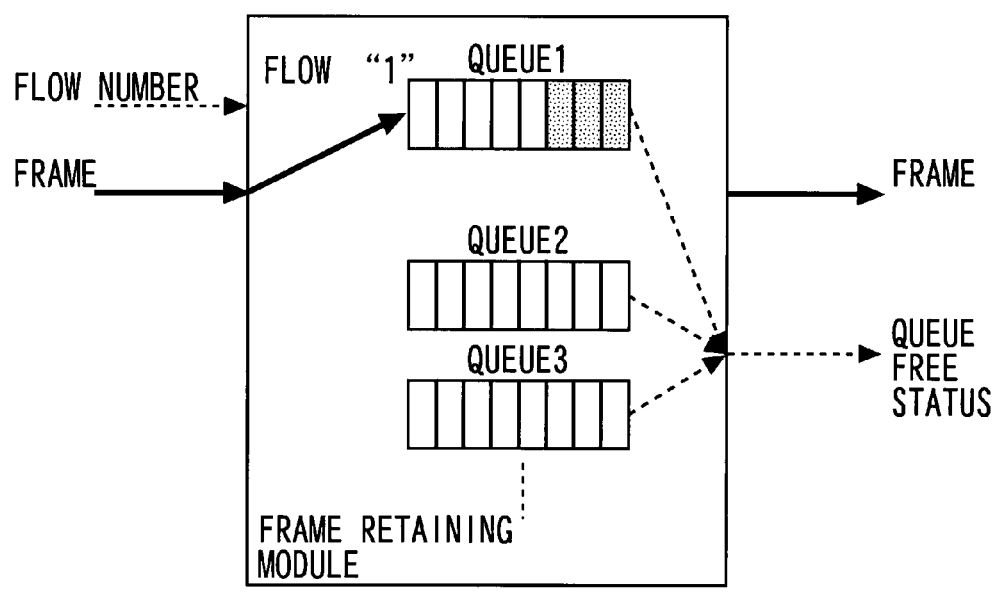
FIG. 10 is a diagram showing an internal configuration of a frame retaining module in the embodiment.
FIG. 11 is a diagram showing an outline of a configuration of a traffic rate measuring counter in the embodiment.

The frame retaining modules 13u, 13d have a plurality of queues inside, and store the frames transferred from the discard control modules 12u, 12d in the queues corresponding to the flow numbers. FIG. 10 is a diagram illustrating an internal structure of each of the frame retaining modules 13u, 13d in the first embodiment. In the first embodiment, the frame retaining modules 13u, 13d have the queues for the uplink traffic and the queues for the downlink traffic by tens respectively, wherein each queue has a 2 MB capacity. Further, upon receiving frame acquisition requests from the bandwidth control modules 14u, 14d, the frames in the queues are transferred to the bandwidth control modules 14u, 14d. Moreover, the uplink frame retaining module 13u transfers free status information of the queue together with the frame to the bandwidth control module 14u.

The bandwidth control modules 14u, 14d issue, based on a preset bandwidth control rule, the frame acquisition requests to the frame retaining modules 13u, 13d, and thereafter forward the frames transferred from the frame retaining modules 13u, 13d to the LAN 30b or the WAN 20. Normally, the frames shall be acquired from the frame retaining modules 13u, 13d so as not to exceed the bandwidth of the LAN 30b or the WAN 20 connected thereto and then transmitted via the NIC 105. Under the control of the downlink traffic in the first embodiment, the bandwidth control module 14d conducts priority control and the bandwidth control including committed information rate (CIR) etc according to the normal bandwidth control rule.

By contrast, under the uplink traffic control in the first embodiment, the bandwidth control module 14u, though normally performing the bandwidth control according to the bandwidth control rule, determines, when receiving a traffic rate adjusting (traffic shaping) instruction, which will be explained later on, from the traffic rate measuring module 16, a request forwarding interval on the basis of a predictive traffic size (amount-of-traffic) calculation result given from the response measuring module 15 and a transmission bandwidth of the WAN 20. Further, at every forwarding interval, the frame acquisition request is issued to the frame retaining module 13u, and the frame transferred from the frame retaining module 13u is forwarded to the data center LAN 30b (traffic rate control). Moreover, the bandwidth control module 14u receives the queue free status information from the uplink frame retaining module 13u, and terminates the traffic rate control at a point of time when confirming that the queue is free or that a predetermined free capacity exists. It is to be noted that the queue to be monitored herein may be only the queue for the uplink traffic, however, the traffic rate control, it is preferable, be terminated at a point of time when monitoring both of the queue for the uplink traffic and the queue for the downlink traffic and confirming that sufficient free capacities are ensured in these queues. This is because if the traffic rate control is terminated by making the judgment about the termination on the basis of only the queue for the uplink traffic, there might be a possibility of causing an overflow of the queue for the downlink traffic of the response frames to the already-transmitted request frames.

The response measuring module 15 measures, in the reception frames, a frame size of the frames related to the response message, and measures a traffic size of the response (response frames) to one request message. Then, an average size of the response traffic to one request message is calculated from the thus-measured traffic size of the response to each request message. The calculation result is transferred as the predictive traffic size to the bandwidth control module 14u. Note that if the response message is organized by a plurality of frames, it is judged from header information of each of the reception frames whether these frames are the response frames to the same request message or not, and the sizes of the response frames to the same request message are totaled up, thereby measuring the traffic size of the response to one request message.

The traffic rate measuring module 16 measures a frame traffic rate of the frames coming from the server 50 on the unit of 1.0 msec, and issues the traffic rate adjusting (traffic shaping) instruction to the bandwidth control module 14*u* just when a frame reception rate comes to equal or over a physical bandwidth of WAN 20 (which is on the order of 100 Kbps (Kilo bits per second)=12.5 KB (Kilo Bytes)/msec (millisecond) or more in the first embodiment). The traffic rate measuring module 16 retains, e.g., a counter for measuring a reception byte count per 1.0 msec as shown in FIG. 11 in order to measure the traffic rate.

Figure 12:
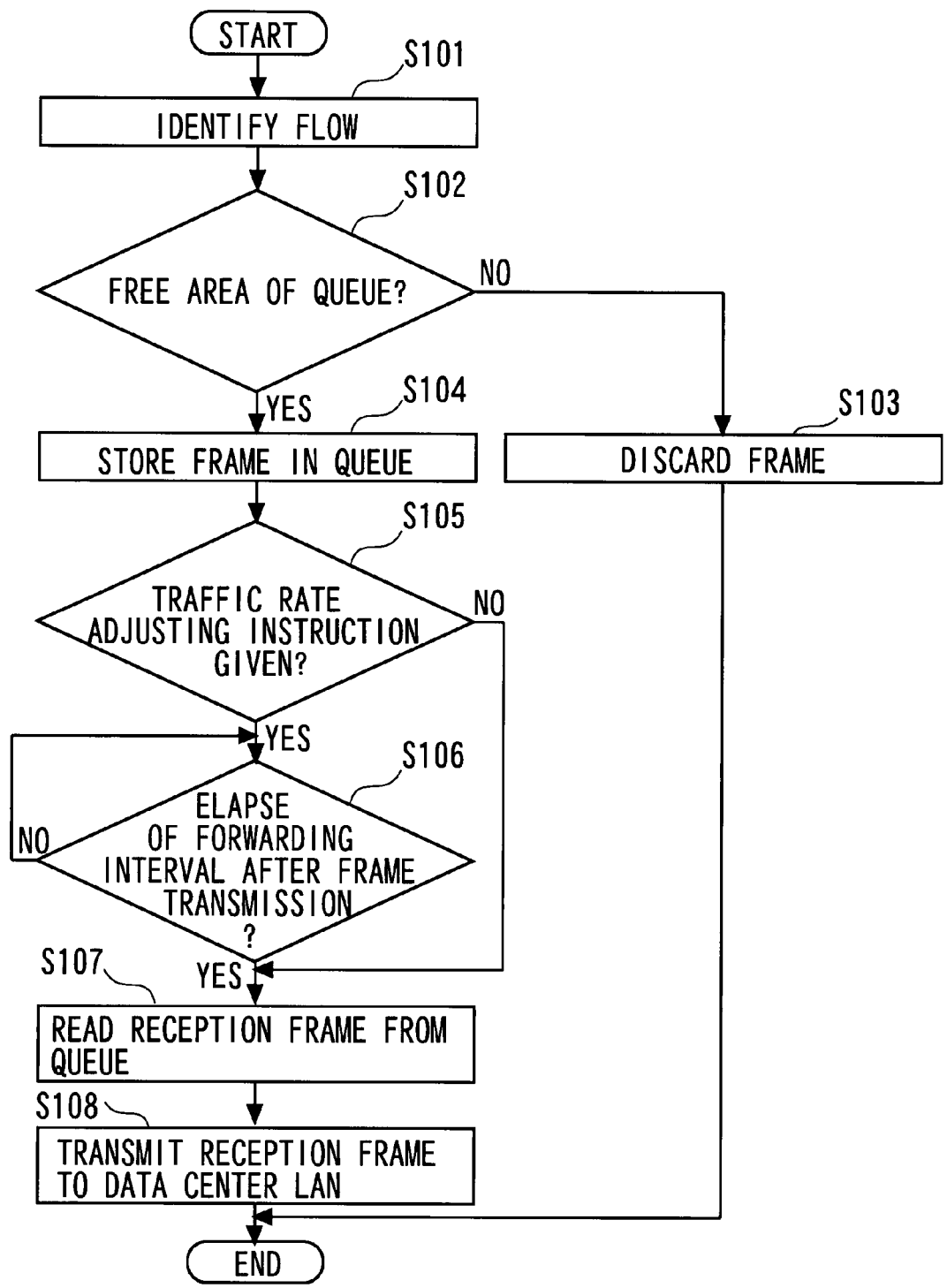
FIG. 12 is a flowchart showing a flow of bandwidth control for every reception of one frame with respect to uplink traffic in the embodiment.

FIG. 12 is a flowchart showing a flow of the bandwidth control for every reception of one frame with respect to the uplink traffic in the first embodiment. Processes shown in the present flowchart are started as triggered by the NIC 105 receiving the frame addressed to the data center LAN 30*b* and are controlled by the CPU 101.

In step S101, the flow is identified. The flow identifying module 11*u* refers to the header information of the received frame, thereby identifying the flow. A scheme in the first embodiment is that when the frame addressed to the server 50 can be identified from the header information of the frame, the flow identifying module 11*u* assigns a flow number "1" to the received frame. Further, other types of frames, with the flows being identified from pieces of header information of the frames, are assigned proper flow numbers. The flow identifying module 11*u* transfers the identification result and the reception frame to the discard control module 12*u*. Thereafter, the processing advances to step S102.

In step S102, the free status of the queue is judged. The discard control module 12*u* judges whether or not the queue specified by the flow number has a free area enough to store the reception frame. If the queue is judged not to have free area, the processing proceeds to step S103. If the queue is judged to have the free area, the processing proceeds to step S104.

In step S103, the frame is discarded. The discard control module 12*u*, when the queue has no free area, discards the reception frame. Thereafter, the processes shown in the present flowchart are terminated.

In step S104, the frame is stored in the queue. The discard control module 12*u* transfers the reception frame to the uplink frame retaining module 13*u*. The uplink frame retaining module 13*u* receiving the reception frame stores the reception frame in the queue for the uplink traffic that is specified by the flow number concerned. Thereafter, the processing advances to step S105.

In step S105, it is judged whether the traffic rate adjusting instruction is issued or not. The bandwidth control module 14*u* judges whether or not the traffic rate adjusting instruction is issued from the traffic rate measuring module 16 that will be explained later on. If the traffic rate adjusting instruction is issued, the processing proceeds to step S106. Whereas if the traffic rate adjusting instruction is not issued, the processing advances to step S107.

In step S106, it is judged whether or not a forwarding interval elapses after transmitting the frame. The bandwidth control module 14*u*, if the traffic rate adjusting instruction is issued, judges whether or not the forwarding interval elapses after the frame transmission of the last time in order to forward the request frame at the proper traffic rate. Herein, the forwarding interval represents a period of time (the unit of time is msec) showing an interval at which the frame should be forwarded to the data center LAN 30*b* from the WAN 20. A method of calculating the forwarding interval will be described later on (refer to step S208). The bandwidth control module 14*u* repeats the process in step S106 till it is judged that the forwarding interval has elapsed. When judging that the forwarding interval elapses, the processing advances to step S107.

In step S107, the reception frame is read out of the queue. The bandwidth control module 14*u* issues a frame acquisition request to the uplink frame retaining module 13*u*, and the uplink frame retaining module 13*u* receiving this request reads the reception frame stored earliest in the queue from this queue and transfers this frame to the bandwidth control module 14*u*. Thereafter, the processing advances to step S108.

In step S108, the reception frame is transmitted to the data center LAN 30*b*. The bandwidth control module 14*u* transfers the frame handed over from the uplink frame retaining module 13*u* in step S107 to the NIC 105 connected to the data center LAN 30*b*. Thereafter, the NIC 105 sends the reception frame to the LAN 30*b*, whereby the forwarding of the reception frame is completed and the processes shown in the present flowchart are finished.

Figure 13:
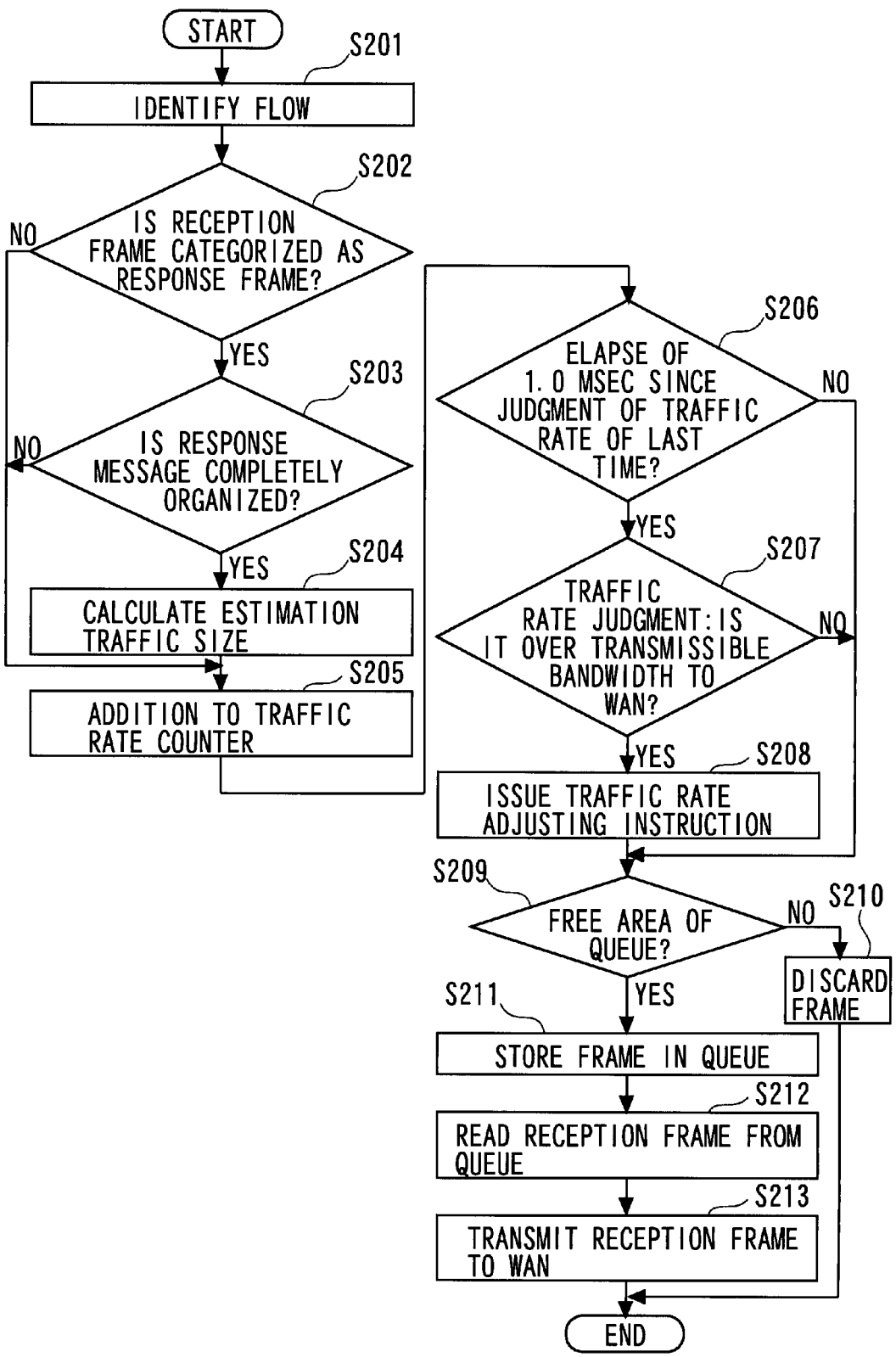
FIG. 13 is a flowchart showing a flow of the bandwidth control for every reception of one frame with respect to downlink traffic in the embodiment.

FIG. 13 is a flowchart showing a flow of the bandwidth control for every reception of one frame in the downlink traffic in the first embodiment. The processes shown in the present flowchart are started as triggered by the NIC 105 receiving the frame addressed to the WAN 20, and are controlled by the CPU 101.

In step S201, the flow is identified. The flow identifying module 11*d* refers to the header information of the received frame, thereby identifying the flow. For instance, if a source of the frame can be identified with the server 50 from the header information of the frame, the flow identifying module 11*d* assigns a flow number "1" to the received frame. The flow identifying module 11*d* transfers the identification result and the reception frame to the discard control module 12*d*. Thereafter, the processing advances to step S202.

In step S202, it is judged whether the reception frame is the response frame or not. Herein, the response frame connotes a frame so transmitted as to be addressed to the client 40 by way of a response to the request frame received from the client 40. The response measuring module 15 judges whether the received frame (reception frame) is the response frame or not. If the reception frame is judged to be the response frame, the processing proceeds to step S203. Whereas if the reception frame is judged not to be the response frame, the processing diverts to step S205.

In step S203, it is judged whether the response message is completely organized or not. The response measuring module 15 judges whether or not the received frame is the frame that completely organizes the response message divided into the plurality of frames in combination with the frames received so far. Namely, in step S203, it is judged whether or not there are received all of the response frames divided for the server 50 to calculate the traffic size of the to-be-transmitted response to the one request message. If the response message is judged to be completely organized, the processing proceeds to step S204. Whereas if the response message is judged not to be completely organized, the processing diverts to step S205.

In step S204, the predictive traffic size is calculated. The response measuring module 15 measures and totals up sizes of all of the response frames transmitted by the server 50 with respect to one request message, thereby calculating a traffic size of the response to one request message. Then, the response measuring module 15 calculates an average size of the response traffic to one request message from the calculated traffic size of the response to each request message. The response measuring module 15 transfers a result of this calculation as the predictive traffic size to the bandwidth control module 14*u*. Thereafter, the processing advances to step S205.

In step S205, an addition to a traffic rate counter is conducted. The traffic rate measuring module 16 adds the size of the reception frame to a traffic rate counter. The traffic rate counter is a counter for calculating the traffic rate per 1.0 msec from the data center LAN 30*b* to the WAN 20. Thereafter, the processing proceeds to step S206.

In step S206, it is judged whether or not 1.0 msec elapses since the traffic rate judgment has been made last time (step S207). When the traffic rate measuring module 16 judges that 1.0 msec elapses, the processing proceeds to step S207. Namely, the process in step S207 is executed once at an interval of approximately 1.0 msec. When judging that 1.0 msec does not elapse since the traffic rate judgment has been made last time, the processing diverts to step S209.

In step S207, the traffic rate is judged. The traffic rate measuring module 16 judges whether or not a traffic rate indicated by the traffic rate counter exceeds a transmissible bandwidth to the WAN 20. Namely, the traffic rate measuring module 16 compares a total of the sizes of the frames transmitted to the WAN 20 from the data center LAN 30*b* per 1.0 msec with the bandwidth of the WAN 20 per 1.0 msec. After making this comparative judgment, the traffic rate counter is reset. If the traffic rate is judged to exceed the bandwidth, the processing advances to step S208. Whereas if the traffic rate is judged not to exceed the bandwidth, the processing diverts to step S209.

In step S208, the traffic rate adjusting instruction is issued. The traffic rate of the traffic from the data center LAN 30*b* to the WAN 20 exceeds the bandwidth, and hence the traffic rate measuring module 16 issues the traffic rate adjusting instruction to the bandwidth control module 14*u*. Herein, the forwarding interval, at which to forward the frame to the data center LAN 30*b* from the WAN 20, is calculated. The bandwidth control module 14*u* calculates the forwarding interval, at which the frame should be forwarded to the data center LAN 30*b* from the WAN 20, on the basis of the predictive traffic size calculated by the response measuring module 15 that will be explained later on and on the basis of the bandwidth of the WAN 20. In the first embodiment, the forwarding interval (the unit of time is msec) is calculated in a way that divides the predictive traffic size by the bandwidth of the WAN 20. A result of this calculation represents the number of request frames that may be forwarded to the data center LAN 30*b* per unit time. Thereafter, the processing advances to step S209.

In step S209, a free status of the queue is judged. The discard control module 12*d* judges whether or not the queue specified by the flow number concerned has a free area enough to store the reception frame when judging that the queue concerned has no free area, the processing diverts to the step S210. When judging that the queue concerned has the free area, the processing advances to the step S211.

In step S210, the frame is discarded. The discard control module 12*d* discards the reception frame because of having no free area in the queue. Thereafter, the processes shown in the present flowchart are finished.

In step S211, the frame is stored in the queue. The discard control module 12*d* stores the reception frame in the corresponding queue in the downlink frame retaining module 13*d*. Thereafter, the processing proceeds to step S212.

In step S212, the reception frame is read from the queue. The bandwidth control module 14*d* issues the frame acquisition request to the downlink frame retaining module 13*d*, and the downlink frame retaining module 13*d* receiving this request reads the reception frame stored earliest in the queue from this queue and transfers the reception frame to the bandwidth control module 14*d*. Thereafter, the processing advances to step S213.

In step S213, the reception frame is transmitted to the WAN 20. The bandwidth control module 14*d* transfers the frame read from the downlink frame retaining module 13*d* to the NIC 105 connected to the WAN 20. Thereafter, the NIC 105 sends the reception frame to the WAN 20, whereby the forwarding of the reception frame is completed and the processes shown in the present flowchart are terminated.

Herein, a processing flow in a case where HTTP requests sent from one hundred of client terminals 40 reach the bandwidth control device 10*b* at an interval of 0.5 msec, will be explained with reference to flowcharts in FIGS. 12 and 13. Incidentally, an assumption is that a size of the HTTP request message is set to 400 bytes, and the server 50 and each of the client terminals 40 are capable of transmitting a content having up to 1 KB per frame. Namely, one HTTP request message is transmitted on one frame. Further, after the bandwidth control device 10*b* has forwarded the HTTP request message to the server 50, a period of time expended for a response frame given from the server 50 to reach the bandwidth control device 10*b* is set to 2.0 msec.

When the bandwidth control device 10*b* forwards the first request message to the server 50 (step S108), the server 50 receiving this message divides the requested content (of which a size is 100 KB) by 100 and thus transmits the response frames each having 1 KB to the client terminal 40. Herein, for simplifying the calculation, the size of one response frame shall be 1 KB, and a size of each of variety of headers contained in the frame shall be ignored. Namely, the traffic of the response to the request message reaches 100 KB on the unit of 0.5 msec, i.e., 1 Gbps that is the bandwidth of the LAN 30*b*, and hence the traffic size of the response exceeds the bandwidth (100 Mbps) of the WAN 20, resulting in an immediate overflow of the queue of the downlink frame retaining module 13*d* in the conventional bandwidth control device 10*b*.

When the bandwidth control device 10*b* according to the first embodiment receives the response frames sent from the server 50, the response measuring module 15, at a point of time when receiving all of the response frames transmitted in a divided manner, totals up the sizes of these response frames, thereby calculating the traffic size of the response to one request message (step S204). Herein, the traffic size of the response to one request message becomes 100 KB. The response measuring module 15 transfers this size (100 KB) as the predictive traffic size to the bandwidth control module 14*u*.

Further, the traffic rate measuring module 16 measures the traffic flowing from the data center LAN 30*b* on the unit of 1.0 msec. In the first embodiment, the frames, corresponding to 1 Gbps (100 KB on the unit of 0.8 msec) defined as an upper limit of the bandwidth of the LAN 30*b*, of the response message to one request message are received and therefore exceed the bandwidth (1 Mbps) of the WAN 20, and hence the traffic rate measuring module 16 issues the traffic rate adjusting instruction to the bandwidth control module 14*u* (step S208).

The bandwidth control module 14*u* receiving the traffic rate adjusting instruction changes a frame transmission speed to the data center LAN 30b into a speed corresponding to one frame transmission on the unit of 8.0 msec on the basis of the predictive traffic size (100 KB) given by the response measuring module 15 and the bandwidth (100 Mbps=12.5 KB/msec) of the WAN 20 (step S106). Therefore, after issuing the traffic rate adjusting instruction, the traffic rate of the response message received from the server 50 is 100 KB on the unit of 8.0 msec, i.e., 12.5 KB/msec and therefore gets equal to the transmissible bandwidth to the WAN 20 from the downlink frame retaining module 13d, wherein no overflow of the response frames occurs in the downlink frame retaining module 13d.

Namely, according to the first embodiment, the bandwidth control involving the use of the uplink frame retaining module is that the transmission rate of the downlink traffic is adjusted by adjusting the request frame transmission timing (interval) in accordance with the traffic size of the downlink traffic, thereby restraining the overflow of the downlink frame retaining module. With this scheme, it is possible to maintain the bandwidth control enabled status (such as a priority control enabled status and a committed information rate (CIR) enabled status) with respect to the response frames of the individual users, which are stored in the downlink frame retaining module. Owing to the scheme described above, it is feasible to increase the bandwidth control enabled user count and the bandwidth-controlled traffic size of the downlink traffic with the same buffer size as of the conventional bandwidth control device 10b.

Second Embodiment

Figure 14:
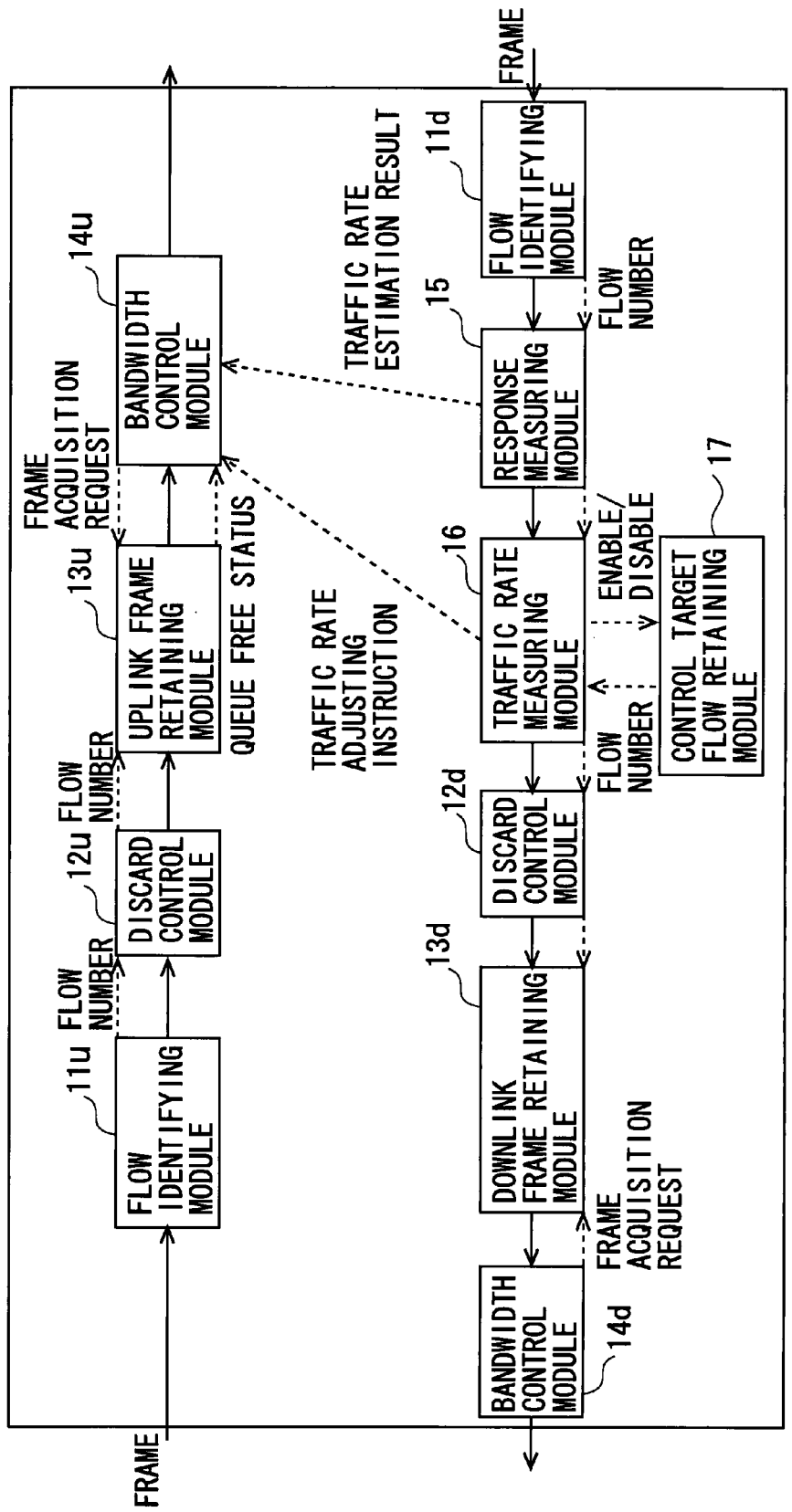
FIG. 14 is a diagram showing an outline of a processing flow of the reception frame by each of the functions provided in the bandwidth control device in the embodiment.

A second embodiment will hereinafter be described. A network configuration and a hardware configuration of the bandwidth control device 10b in the second embodiment are the same as those in the first embodiment, and hence their explanations are omitted. FIG. 14 is a diagram showing an outline of a processing flow of the reception frame by each of the functions provided in the bandwidth control device 10b in the second embodiment. The CPU 101 executes the programs developed on the RAM 102 or the ROM 104, thereby functioning as the flow identifying modules 11u, 11d, the discard control modules 12u, 12d, the uplink/downlink frame retaining modules 13u, 13d, the bandwidth control modules 14u, 14d, the response measuring module 15, the traffic rate measuring module 16, or a control target flow retaining module 17.

The control target flow retaining module 17 retains setting that shows enable/disable of the traffic rate control for every flow identified by the flow identifying modules 11u, 11d. In the second embodiment, the control target flow retaining module 17 retains a flow number and a flag showing the enable (1)/disable (0) of the traffic rate control about the flow corresponding to the flow number. An assumption is that contents thereof are set beforehand by the administrator etc. FIG. 15 illustrates an example of a structure of the present entry.

The traffic rate measuring module 16 searches trough the control target flow retaining module 17 with the flow number of the reception frame, then measures the frame traffic rate of the frames from the server 50 on the unit of 1.0 msec if the flag shows the "enable", and, at a point of time when reaching a frame reception rate equal to or larger than the physical bandwidth of the WAN 20, transfers the traffic rate adjusting instruction with respect to the flow number concerned to the bandwidth control module 14u.

Further, under the control of the uplink traffic in the second embodiment, the bandwidth control module 14u, though normally performing the bandwidth control according to the normal bandwidth control rule explained in the first embodiment, upon receiving the traffic rate adjusting instruction from the traffic rate measuring module 16, determines the forwarding interval of the request frames on the basis of the predictive traffic size given from the response measuring module 15 and the transmission bandwidth of the WAN 20, and controls the traffic rate with respect to the queue corresponding to the designated flow number.

The functions of the flow identifying modules 11u, 11d, the discard control modules 12u, 12d, the uplink/downlink frame retaining modules 13u, 13d and the response measuring module 15 are the same as those in the first embodiment, and hence their explanations are omitted.

Figure 16:
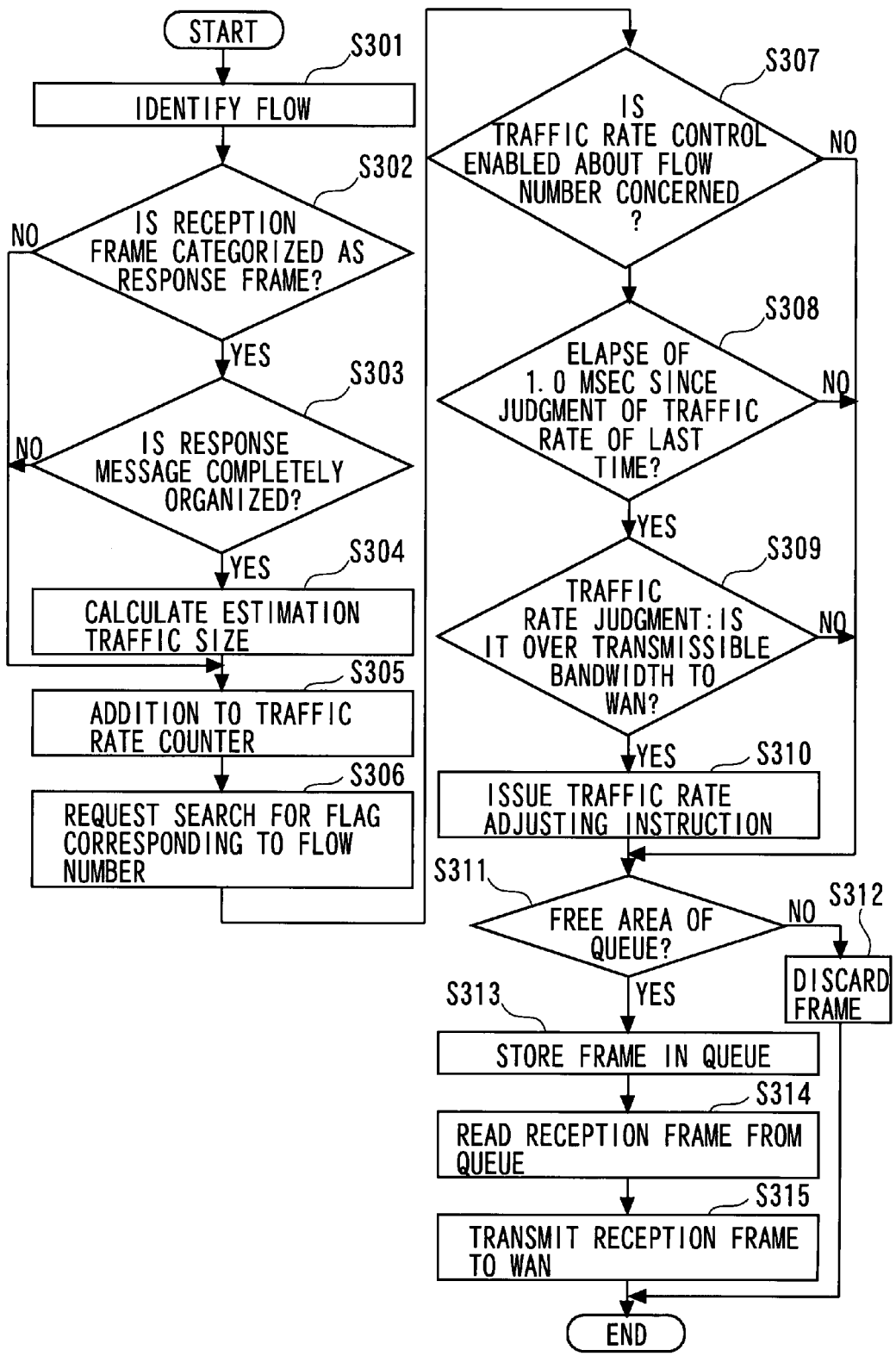
FIG. 16 is a flowchart showing a flow of the bandwidth control for every reception of one frame with respect to the downlink traffic in the embodiment.

FIG. 16 is a flowchart showing a flow of the bandwidth control for every reception of one frame with respect to the downlink traffic in the second embodiment. The processes shown in the present flowchart are started as triggered by the NIC 105 receiving the frame addressed to the WAN 20 and are controlled by the CPU 101.

The processes shown in step S301 through step S305 are the same as the processes shown in step S201 through step S205 in FIG. 13, and therefore their explanations are omitted.

In step S306, a search request for the flag corresponding to the flow number is made. The traffic rate measuring module 16 requests the control target flow retaining module 17 to do searching in a way that specifies the flow number. Thereafter, the processing advances to step S307.

In step S307, it is judged whether the traffic rate control is enable or disable for the flow number concerned. The control target flow retaining module 17, upon receiving the search request in step S306, reads the flag corresponding to the flow number and judges from a content of the flag whether the traffic rate control is enable (1) or disable (0). When judging that the traffic rate control is enabled for the flow number, the processing proceeds to step S308. When judging that the traffic rate control is disabled for the flow number, the processing diverts to step S311.

The processes shown in step S311 through S315 are the same as the processes shown in step S209 through S213 in FIG. 13, and hence their explanations are omitted.

Namely, if the traffic rate control is enabled for the flow number, the processes, from step S308 onward, of issuing the traffic rate adjusting instruction are executed, wherein the traffic rate adjusting instruction is issued if the traffic rate of the downlink traffic related to the flow concerned is equal to or larger than a fixed rate. By contrast, if the traffic rate control is disabled for the flow number, the operation skips over the processes shown in step S308 through step S310, and, even if the traffic rate of the downlink traffic related to the flow concerned is equal to or larger than the fixed rate, none of the traffic rate adjusting instruction is issued.

Namely, according to the second embodiment, the traffic rate control can be applied to only the specified flow by judging whether the traffic rate control is enabled or disabled for every specified flow.

Third Embodiment

Figure 17:
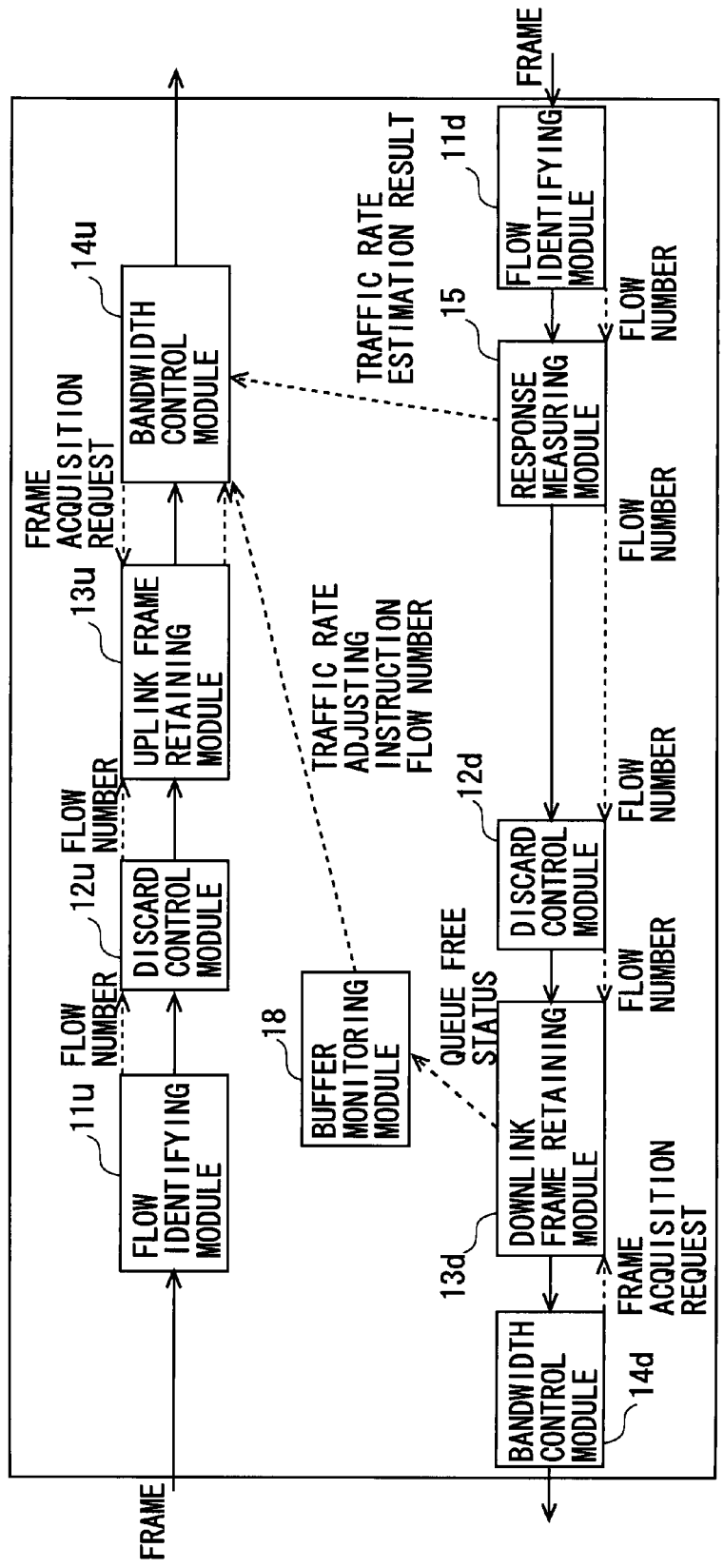
FIG. 17 is a diagram showing an outline of a processing flow of the reception frame by each of the functions provided in the bandwidth control device in the embodiment.

A third embodiment will hereinafter be described. A network configuration and a hardware configuration of the bandwidth control device 10b in the third embodiment are the same as those in the first embodiment, and hence their explanations are omitted. FIG. 17 is a diagram showing an outline of a processing flow of the reception frame by each of the functions provided in the bandwidth control device 10b in the third embodiment. The CPU 101 executes the programs developed on the RAM 102 or the ROM 104, thereby functioning as the flow identifying modules 11$u$, 11$d$, the discard control modules 12$u$, 12$d$, the uplink/downlink frame retaining modules 13$u$, 13$d$, the bandwidth control modules 14$u$, 14$d$, the response measuring module 15, or a buffer monitoring module 18.

The uplink/downlink frame retaining modules 13$u$, 13$d$ correspond to the CPU 101 performing the functions explained in the first embodiment, and further notify anytime the buffer monitoring module 18 of a free status of each queue in the third embodiment.

The buffer monitoring module 18 monitors the free status of each queue in the downlink frame retaining module 13$d$, and, just when reaching 40% or more as a usage rate of the queue, issues the traffic rate adjusting instruction to the bandwidth control module 14$u$. The bandwidth control module 14$u$ receiving this instruction, in the same way as in the case of receiving the traffic rate adjusting instruction from the traffic rate measuring module 16 in the first embodiment, performs the traffic rate control (refer to step S106 and step S107 in FIG. 12) in accordance with the traffic rate adjusting instruction issued from the buffer monitoring module 18.

The functions of the flow identifying modules 11$u$, 11$d$, the discard control modules 12$u$, 12$d$, the bandwidth control modules 14$u$, 14$d$ and the response measuring module 15 are the same as those in the first embodiment, and therefore the explanations thereof are omitted.

Figure 18:
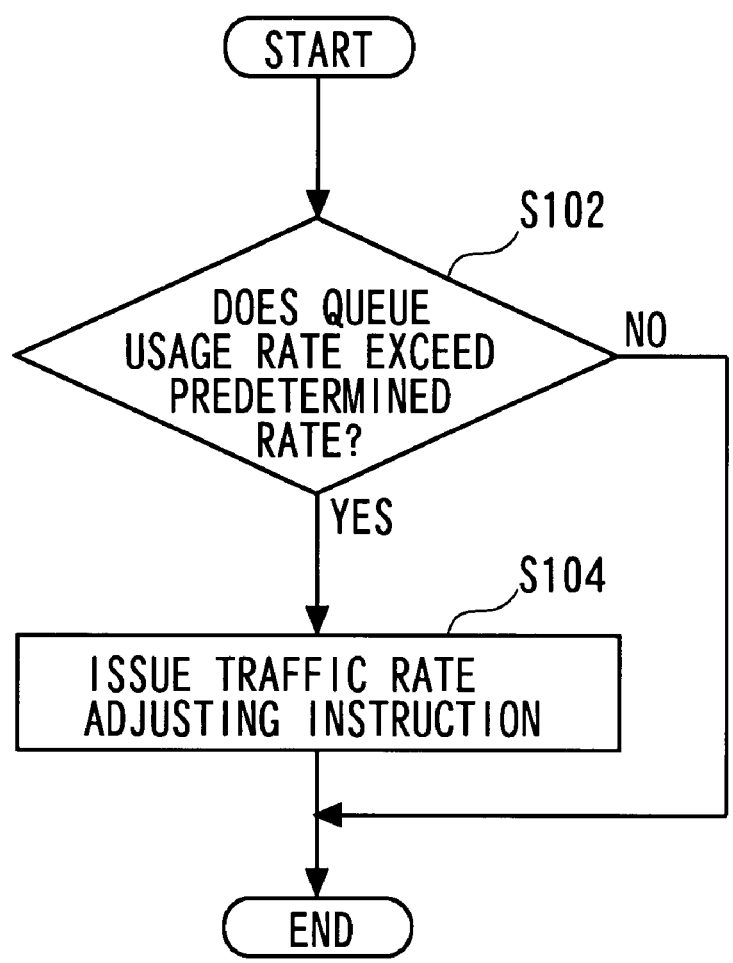
FIG. 18 is a flowchart showing a flow of a buffer monitoring process in the embodiment.

FIG. 18 is a flowchart showing a flow of a buffer monitoring process in the third embodiment. The processes shown in the present flowchart are periodically executed at a predetermined interval and are controlled by the CPU 101.

In step S401, it is judged whether the queue usage rate exceeds a predetermined rate or not. The buffer monitoring module 18 acquires the free status of the queue from the downlink frame retaining module 13$d$, and judges whether or not the queue usage rate exceeds the predetermined rate. In the third embodiment, the predetermined rate is set to 40%. When judging that the queue usage rate is higher than 40%, the processing advances to step S402. When judging that the queue usage rate is not higher than 40%, the processes shown in the present flowchart are finished.

In step S402, the traffic rate adjusting instruction is issued. The buffer monitoring module 18, because of the queue usage rate of the traffic to the WAN 20 from the data center LAN 30$b$ being higher than the predetermined rate (40%), issues the traffic rate adjusting instruction to the bandwidth control module 14$u$. Herein, the forwarding interval, at which to forward the frame to the data center LAN 30$b$ from the WAN 20, is calculated. The bandwidth control module 14$u$ calculates, based on the predictive traffic size calculated by the response measuring module 15 and the bandwidth of the WAN 20, the forwarding interval at which the frame should be forwarded to the data center LAN 30$b$ from the WAN 20. Thereafter, the processes shown in the present flowchart are terminated.

Namely, according to the third embodiment, the queue control is conducted by the conventional method till a predetermined amount of frames stay in the queue for the downlink traffic, and the traffic rate control is started after the predetermined amount of frames have stayed in the queue for the downlink traffic, thereby enabling the queue for the downlink frames to be used effectively.

Fourth Embodiment

Figure 19:
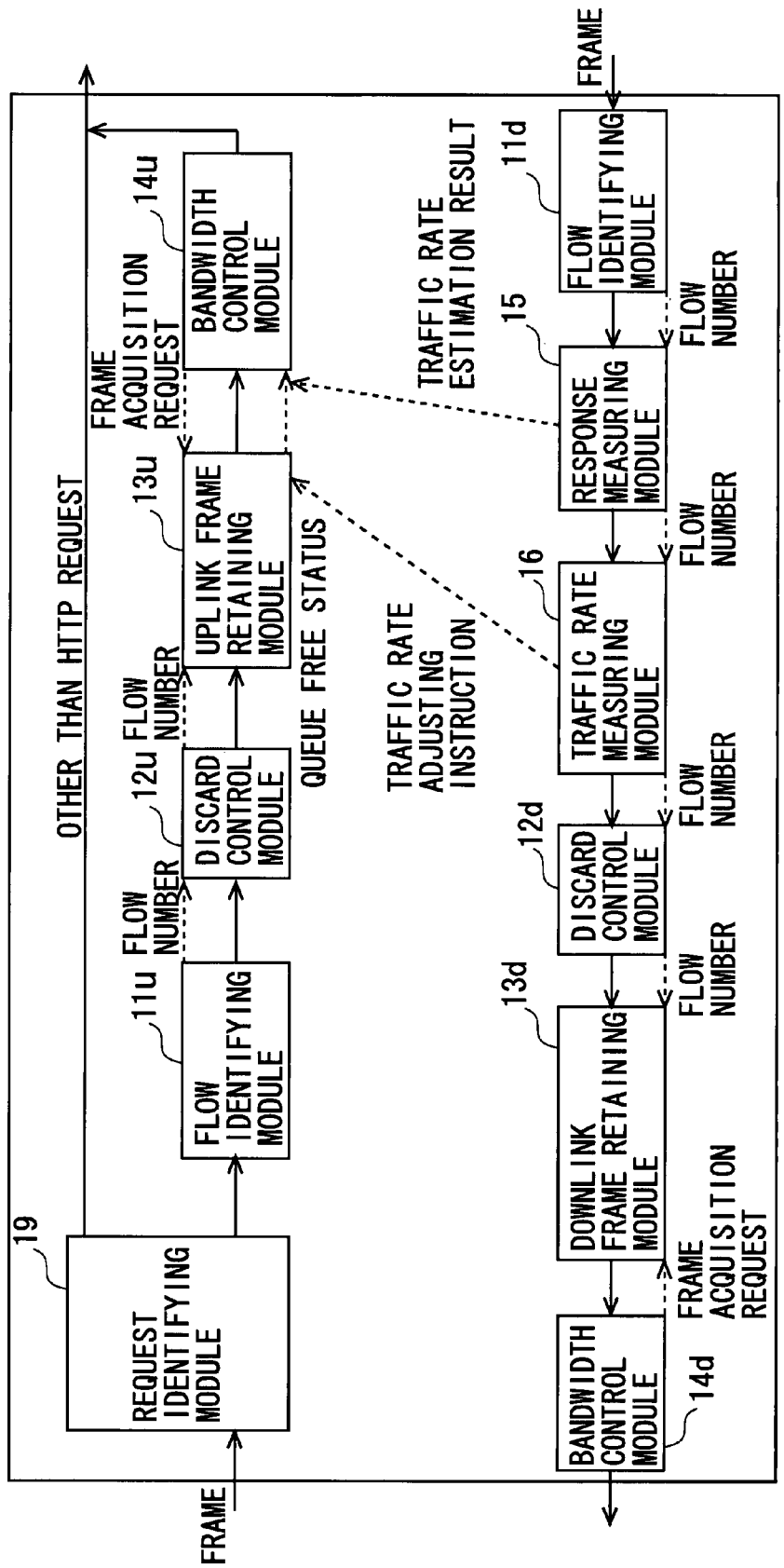
FIG. 19 is a diagram showing an outline of a processing flow of the reception frame by each of the functions provided in the bandwidth control device in the embodiment.

A fourth embodiment will hereinafter be described. A network configuration and a hardware configuration of the bandwidth control device 10$b$ in the fourth embodiment are the same as those in the first embodiment, and hence their explanations are omitted. FIG. 19 is a diagram showing an outline of a processing flow of the reception frame by each of the functions provided in the bandwidth control device 10$b$ in the fourth embodiment. The CPU 101 executes the programs developed on the RAM 102 or the ROM 104, thereby functioning as a request identifying module 19, the flow identifying modules 11$u$, 11$d$, the discard control modules 12$u$, 12$d$, the uplink/downlink frame retaining modules 13$u$, 13$d$, the bandwidth control modules 14$u$, 14$d$, the response measuring module 15, or the traffic rate measuring module 16.

The request identifying module 19 identifies the reception frame sent from the WAN 20, then transfers the frames to the flow identifying module 11$u$ when the frames are defined as the HTTP request message, and transfers the frames to the data center LAN 30$b$ when the frames are not the frames related to the HTTP request message.

The functions of the flow identifying modules 11$u$, 11$d$, the discard control modules 12$u$, 12$d$, the uplink/downlink frame retaining modules 13$u$, 13$d$, the bandwidth control modules 14$u$, 14$d$, the response measuring module 15 and the traffic rate measuring module 16 are the same as those in the first embodiment, and therefore the explanations thereof are omitted.

Figure 20:
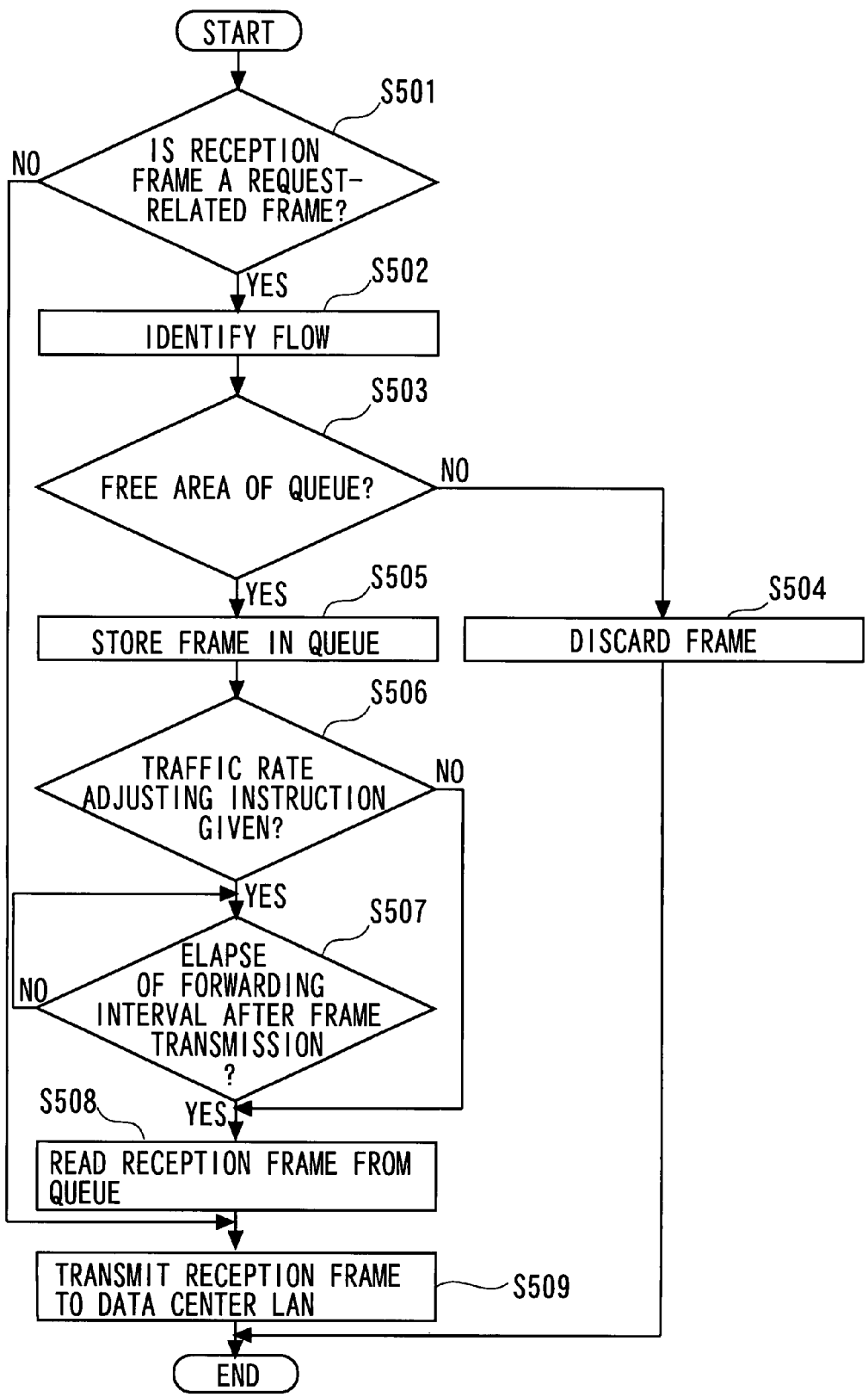
FIG. 20 is a flowchart showing a flow of the bandwidth control for every reception of one frame with respect to the uplink traffic in the embodiment.

FIG. 20 is a flowchart showing a flow of the bandwidth control for every reception of one frame with respect to the uplink traffic in the fourth embodiment. The processes shown in the present flowchart are started as triggered by the NIC 105 receiving the frame addressed to the data center LAN 30$b$ and are controlled by the CPU 101.

In step S501, it is judged whether or not the received frames are the frames related to the HTTP request message. The request identifying module 19 judges from the header information etc (a frame size, a protocol number, a port number, a message content, etc) of the reception frame whether or not the frames are the frames related to the HTTP request message. When judging that the reception frames are the frames related to the HTTP request message, the processing proceeds to step S502. When judging that the reception frames are not the frames related to the HTTP request message, the processing diverts to step S509.

The processes from step S502 onward are the same as the processes in step S101 through step S108 shown in FIG. 12, and hence their descriptions are omitted.

Namely, if the frames received by the bandwidth control device 10$b$ from the WAN 20 are not the frames related to the HTTP request message but, e.g., Echo request frames etc based on ICMP (Internet Control Message Protocol), the frames are forwarded to the data center LAN 30$b$ without undergoing the traffic rate control based on the traffic rate adjusting instruction.

That is to say, according to the fourth embodiment, the traffic rate control is targeted at only the HTTP request message, thereby making it possible to reduce a memory capacity utilized for the queue for the uplink traffic and CPU usage for the traffic rate control.

Fifth Embodiment

Figure 21:
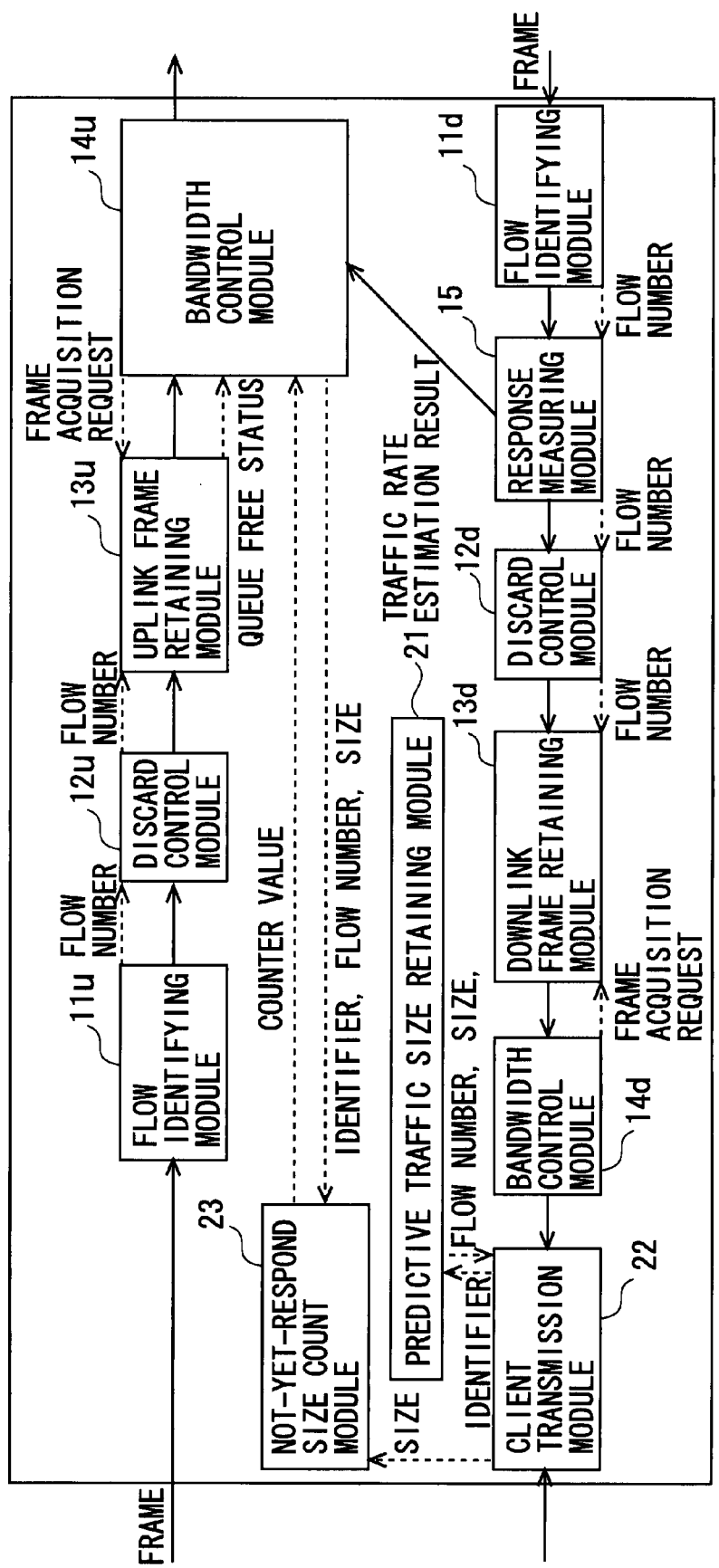
FIG. 21 is a diagram showing an outline of a processing flow of the reception frame by each of the functions provided in the bandwidth control device in the embodiment.

A fifth embodiment will hereinafter be explained. A network configuration and a hardware configuration of the bandwidth control device 10$b$ in the fifth embodiment are the same as those in the first embodiment, and hence their explanations are omitted. FIG. 21 is a diagram showing an outline of a processing flow of the reception frame by each of the functions provided in the bandwidth control device 10$b$ in the fifth embodiment. The CPU 101 executes the programs developed on the RAM 102 or the ROM 104, thereby functioning as the flow identifying modules 11$u$, 11$d$, the discard control modules 12$u$, 12$d$, the uplink/downlink frame retaining modules 13$u$, 13$d$, the bandwidth control modules 14$u$, 14$d$, the response measuring module 15, a not-yet-respond size count module 23, a predictive traffic size retaining module 21, or a client transmission module 22.

Figure 22:
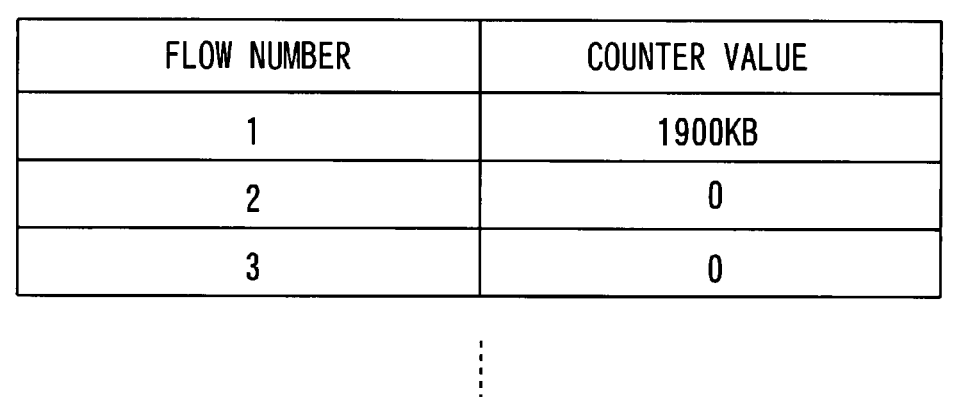

The not-yet-respond size count module 23 includes a not-yet-respond size counter for counting and retaining, per flow, the predictive traffic size of the response message that is not yet transmitted to the WAN 20 though the request message has been sent to the data center LAN 30$b$. FIG. 22 is a diagram showing an example of a structure of the not-yet-respond size counter in the fifth embodiment.

The predictive traffic size retaining module 21 retains, for every HTTP request message, items of request identifying information such as a URL (Uniform Resource Locator) of a request message transmission target, an IP address of the server 50, an IP address of the client 40, a flow number and a predictive traffic size. An example of this structure is illustrated in FIG. 23.

The client transmission module 22, when transmitting the response message, searches the entries in the predictive traffic size retaining module 21 on the basis of the request identifying information such as the URL attached to the message, the IP address of the server 50 and the IP address of the client 40, thereby acquiring the flow number and the predictive traffic size. Only the predictive traffic size is subtracted from the counter value of the not-yet-respond size count module 23.

Further, normally the bandwidth control modules 14$u$, 14$d$ perform the bandwidth control according to the normal bandwidth control rule explained in the first embodiment. Herein, under the control of the uplink traffic in the fifth embodiment, the bandwidth control module 14$u$, before transmitting the HTTP request message to the data center LAN 30$b$, adds just a value equivalent to the predictive traffic size acquired from the response measuring module 15 to the counter value of the not-yet-respond size count module 23. Moreover, on this occasion, the bandwidth control module 14$u$ transfers the target URL, the IP address of the server 50, the IP address of the client 40, the flow number and the predictive traffic size to the predictive traffic size retaining module 21.

Still further, the bandwidth control module 14$u$, at a point of time when the counter value of the not-yet-respond size count module 23 exceeds a free area size of the queue, stops reading the frames from the frame retaining module 13$u$. If the value of the not-yet-respond size count module 23 decreases but does not exceed the free area size of the queue for the downlink traffic, the bandwidth control module 14$u$ transfers the frame acquisition request to the frame retaining module 13$u$, and forwards the frames transferred from the frame retaining module 13$u$ to the data center LAN 30$b$.

The functions of the flow identifying modules 11$u$, 11$d$, the discard control modules 12$u$, 12$d$, the uplink/downlink frame retaining modules 13$u$, 13$d$, the bandwidth control modules 14$u$, 14$d$ and the response measuring module 15 are the same as those in the first embodiment, and therefore the explanations thereof are omitted.

Figure 24:
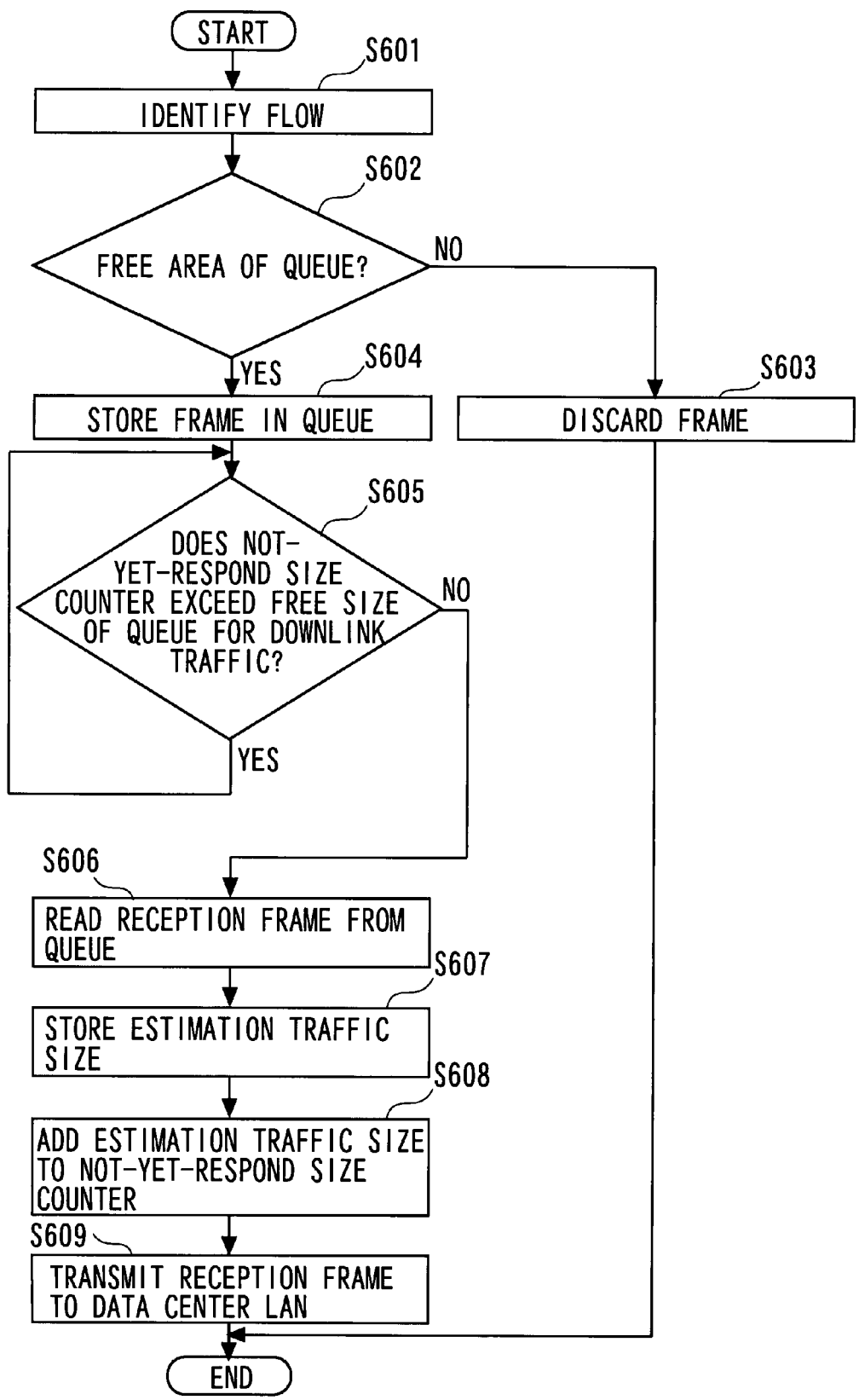
FIG. 24 is a flowchart showing a flow of the bandwidth control for every reception of one frame with respect to the uplink traffic in the embodiment.

FIG. 24 is a flowchart showing a flow of the bandwidth control for every reception of one frame with respect to the uplink traffic in the fifth embodiment. The processes shown in the present flowchart are started as triggered by the NIC 105 receiving the frame addressed to the data center LAN 30$b$ and are controlled by the CPU 101.

The processes from step S601 through step S604 are the same as the processes in step S101 through step S104 shown in FIG. 12, and hence their descriptions are omitted.

In step S605, it is judged whether or not a value of the not-yet-respond size counter exceeds the free area size of the queue for the downlink traffic. The bandwidth control module 14$u$ acquires the value of the not-yet-respond size counter from the not-yet-respond size count module 23, and judges whether or not the counter value exceeds the free area size of the queue for the downlink traffic. In the fifth embodiment, the size of the queue is on the order of 2 MB, and therefore the free area size of the queue for the downlink traffic becomes a [usage capacity of the queue for the downlink traffic as of 2 MB]. This is because the value of not-yet-respond size counter indicates the predictive traffic size predicted when received as the response frame from the server 50 hereafter, and an excess of this value over the free area size of the queue for downlink traffic implies an overflow of the queue. If the value of the not-yet-respond size counter does not exceed the free area size of the queue for the downlink traffic, the overflow of the queue is not predicted, and hence the processing proceeds to step S606. If the value of the not-yet-respond size counter exceeds the free area size of the queue for the downlink traffic, the overflow of the queue is predicted, and hence the judgment process in step S605 is repeated till the value of the not-yet-respond size counter gets equal to or smaller than 2 MB.

In step S606, the reception frame is read from the queue. The bandwidth control module 14$u$ issues the frame acquisition request to the uplink frame retaining module 13$u$, and the uplink frame retaining module 13$u$ receiving this request reads the reception frame stored earliest in the queue from this queue, and transfers the reception frame to the bandwidth control module 14$u$. Thereafter, the processing proceeds to step S607.

In step S607, the predictive traffic size is stored. The predictive traffic size retaining module 21 stores the RAM 102 with the URL of the request message transmission target, the IP address of the server 50, the IP address of the client 40, the flow number and the predictive traffic size of the response that will be predicted to occur with respect to the request message. The predictive traffic size stored herein is the predictive traffic size calculated by the response measuring module 15 before the present process. Thereafter, the processing advances to step S608.

In step S608, the predictive traffic size is added to the not-yet-respond size counter. The not-yet-respond size count module 23 adds the predictive traffic size retained by the predictive traffic size retaining module 21 in step S607 to the not-yet-respond size counter. Thereafter, the processing advances to step S609.

In step S609, the reception frame is transmitted to the data center LAN 30$b$. The bandwidth control module 14$u$ transfers the frame handed over from the uplink frame retaining module 13$u$ in step S606 to the NIC 105 connected to the data center LAN 30$b$. Thereafter, the NIC 105 sends the reception frame to the data center LAN 30$b$, thereby completing the forwarding of the reception frame and finishing the processes shown in the present flowchart.

Figure 25:
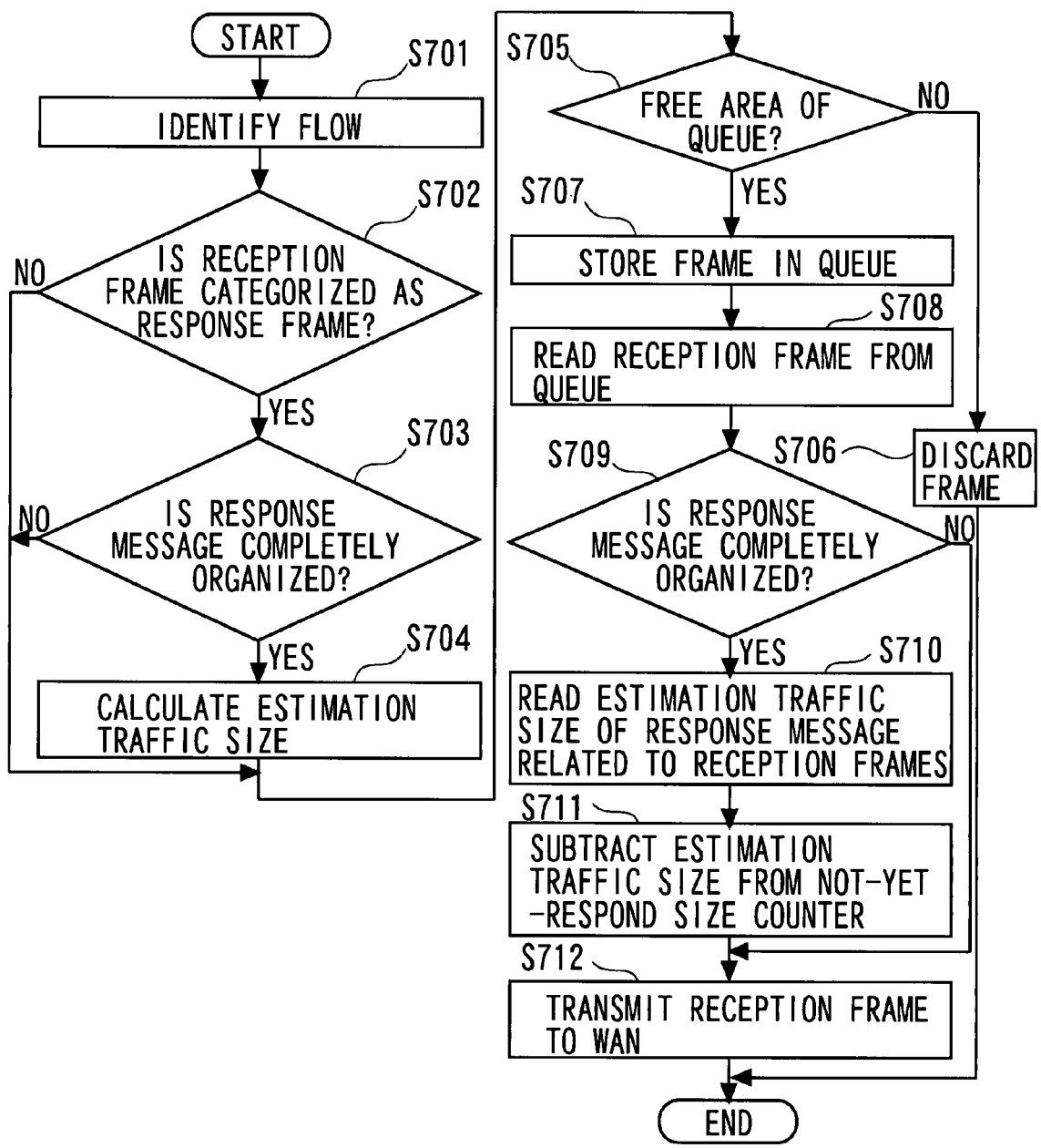
FIG. 25 is a flowchart showing a flow of the bandwidth control for every reception of one frame with respect to the downlink traffic in the embodiment.

FIG. 25 is a flowchart showing a flow of the bandwidth control for every reception of one frame with respect to the downlink traffic in the fifth embodiment. The processes shown in the present flowchart are started as triggered by the NIC 105 receiving the frame addressed to the WAN 20 and are controlled by the CPU 101.

The processes from step S701 through step S708 are the same as the processes in step S201 through step S204 shown in FIG. 13, and hence their descriptions are omitted. Namely, the fifth embodiment does not involve carrying out the processes in step S205 through step S208 executed by the traffic rate measuring module 16, which are shown in FIG. 13 according to the first embodiment. This is because the bandwidth control module 14u in place of the traffic rate measuring module 16 makes the judgment about the start/end of the traffic rate control on the basis of the counter value acquired from the not-yet-respond size count module 23.

In step S709, it is judged whether the response message is completely organized or not. The client transmission module 22 judges whether or not the received frame is the frame that completely organizes the response message divided into the plurality of frames in combination with the frames received so far. When judging that the response message has been completely organized, the processing proceeds to step S710. When judging that the response message is not yet completely organized, the processing diverts to step S712.

In step S710, the predictive traffic size of the response message related to the reception frames is read out. The client transmission module 22 reads the predictive traffic size from the predictive traffic size retaining module 21 on the basis of the URL of the sender of the response message, the IP address of the server 50, the IP address of the client 40 and the flow number. Thereafter, the processing proceeds to step S711.

In step S711, the predictive traffic size is subtracted from the value of the not-yet-respond size counter. The not-yet-respond size count module 23 subtracts, from the not-yet-respond size counter, the predictive traffic size related to the response message, which has been read out in step S710. To be more specific, the not-yet-respond size count module 23 subtracts the predictive traffic size about the request message, which has been added in step S608 when forwarding the request message to the server 50 because of receiving all of the response messages to the request message. The counter undergoes an addition when forwarding the request message (refer to step S608), and undergoes a subtraction when forwarding the response message to this request message, whereby the not-yet-respond size count module 23 retains the predictive traffic size that is not yet transmitted to the WAN 20 though the request message has been sent to the data center LAN 30b, i.e., retains a value of the free capacity that should be ensured in the queue for the downlink traffic. The value of this not-yet-respond size counter is acquired by the process in step S605 shown in FIG. 24 and serves as a judgment index for predicting the overflow of the queue. Thereafter, the processing proceeds to step S712.

In step S712, the reception frame is sent to the WAN 20. The client transmission module 22 transfers the frame read from the downlink frame retaining module 13d in step S708 to the NIC 105 connected to the WAN 20. Thereafter, the NIC 105 sends the reception frame to the WAN 20, thereby completing the forwarding of the reception frame and finishing the processes shown in the present flowchart.

According to the fifth embodiment, it does not happen that the HTTP request messages of which the sizes are equal to or larger than the free area sizes of the queues for the downlink traffic concentrate on the server 50, and it is possible to reduce the probability of discarding the frames due to a delay of the processing by the server 50.

While the invention has been described in detail with reference to preferred embodiments thereof, it will be apparent to one skilled in the art that various changes can be made, and equivalents employed, without departing from the scope of the invention. Each of the aforementioned documents, including the foreign priority document, JP 2006-293733 filed on 30 Oct., 2006 is incorporated by reference herein in its entirety.

What is claimed is:

1. A bandwidth control device relaying traffic in a way that receives and transmits frames related to bidirectional flows of traffic, the bandwidth control device comprising:
    a response measuring unit to measure a size of a response frame, in reception frames, containing data transmitted from another processing device receiving a data transmission request, and to calculate, based on the measured size, a predictive traffic size defined as a size of the traffic of the response frames predicted to be received as a response to a request frame defined as another data transmission request to said another processing device;
    a frame retaining unit to retain the request frame in the reception frames; and
    a bandwidth control unit to perform, based on the predictive traffic size calculated by the response measuring unit, traffic rate control of the request frame and indirect control of a response traffic size by adjusting transmission timing of the request frame retained by the frame retaining unit.

2. A bandwidth control device according to claim 1, further comprising a traffic rate measuring unit to measure a traffic size of the response frame, and to give an instruction of starting the traffic rate control to the bandwidth control unit when the traffic size exceeds a predetermined value,
    wherein the bandwidth control unit starts the traffic rate control upon receiving the instruction of starting the traffic rate control.

3. A bandwidth control device according to claim 2, wherein the frame retaining unit notifies the bandwidth control unit of buffer information defined as information about a size of a frame retained by the frame retaining unit, and
    the bandwidth control unit finishes the traffic rate control when the size of the frame retained by the frame retaining unit, which is indicated by the buffer information of which the frame retaining unit has notified, is equal to or smaller than a predetermined threshold value.

4. A bandwidth control device according to claim 2, further comprising a control target flow retaining unit to retain, together with flow identifying information, information representing enable or disable of the traffic rate control for every flow defined as a combination of the request frame and a response frame corresponding to the request frame in the reception frames,
    wherein the traffic rate measuring unit searches for, based on the flow identifying information, the information representing the enable or disable of the traffic rate control that is retained by the control target flow retaining unit with respect to the flow related to the received frames, and, if the traffic rate control is disabled, does not give the instruction of starting the traffic rate control.

5. A bandwidth control device according to claim 2, further comprising a request identifying unit to identify as to whether the reception frame is the request frame or not, then getting the reception frame retained by the frame retaining unit when the reception frame is the request frame, and transmitting the reception frame without queuing the reception frame retained by the frame retaining unit when the reception frame is not the request frame.

6. A bandwidth control device according to claim 1, further comprising a buffer monitoring unit to monitor a usage state of the frame retaining unit by periodically acquiring the buffer information defined as the information about the size of a frame retained by the frame retaining unit, and, if the frame size indicated by the buffer information exceeds a predetermined threshold value, to instruct the bandwidth control unit to start the traffic rate control.

7. A bandwidth control device according to claim 1, further comprising:
not-yet-respond size retaining unit to retain, in the response frames corresponding to the received request frame, a total predictive traffic size of the not-yet-received response frames;
a predictive traffic size adding unit to add the predictive traffic size corresponding to the received request frame to the not-yet-respond size retaining unit; and
a response traffic size subtracting unit to subtract, when sending the response frame corresponding to the request frame, the traffic size of the response frame from the not-yet-respond size retaining unit,
wherein the bandwidth control unit compares the total predictive traffic size with a free area capacity of the frame retaining unit, and adjusts, based on a result of the comparison, transmission timing of the request frame retained by the frame retaining unit, thus performing the traffic rate control.

8. A bandwidth control device according to claim 1, further comprising:
a not-yet-respond size retaining unit to retain, in the response frames corresponding to the received request frame, a total predictive traffic size of the not-yet-received response frames;
a predictive traffic size adding unit to add the predictive traffic size corresponding to the received request frame to the not-yet-respond size retaining unit;
a predictive traffic size retaining unit to retain the predictive traffic size corresponding to the received request frame for every flow defined as a combination of the request frame and a response frame corresponding to the request frame; and
a predictive traffic size subtracting unit to acquire a predictive traffic size, corresponding to the response frame to be transmitted, from the predictive traffic size per flow that is retained by the predictive traffic size retaining unit when transmitting the response frame corresponding to the request frame, and to subtract the acquired predictive traffic size from the not-yet-respond size retaining unit,
wherein the bandwidth control unit compares the total predictive traffic size with a free area capacity of the frame retaining unit, and adjusts, based on a result of the comparison, transmission timing of the request frame retained by the frame retaining unit, thus performing the traffic rate control.

9. A bandwidth control method executed by a bandwidth control device relaying traffic in a way that receives and transmits frames related to bidirectional flows of traffic, the bandwidth control method comprising:
measuring a size of a response frame by the bandwidth control device, in reception frames, containing data transmitted from another processing device receiving a data transmission request, and calculating, based on the measured size, a predictive traffic size defined as a size of the traffic of the response frames predicted to be received as a response to a request frame defined as another data transmission request to said another processing device;
retaining the request frame in the reception frames; and
performing, based on the predictive traffic size calculated in the measuring, traffic rate control of the request frame and indirect control of a response traffic size by adjusting transmission timing of the request frame retained in the frame retaining.

10. A bandwidth control method according to claim 9, further comprising measuring a traffic size of the response frame, and giving an instruction of starting the traffic rate control in the performing when the traffic size exceeds a predetermined value,
wherein the performing includes starting the traffic rate control upon receiving the instruction of starting the traffic rate control.

11. A bandwidth control method according to claim 9, further comprising:
retaining, in the response frames corresponding to the received request frame, a total predictive traffic size of the not-yet-received response frames;
adding the predictive traffic size corresponding to the received request frame to a value in the retaining the total predictive traffic size; and
subtracting, when sending the response frame corresponding to the request frame, the traffic size of the response frame from the value in the retaining the total predictive traffic size,
wherein the performing includes comparing the total predictive traffic size with a free area capacity in the retaining the request frame, and adjusting, based on a result of the comparison, transmission timing of the request frame retained in the retaining the request frame, thus performing the traffic rate control.

12. A bandwidth control method according to claim 9, further comprising:
retaining, in the response frames corresponding to the received request frame, a total predictive traffic size of the not-yet-received response frames;
adding the predictive traffic size corresponding to the received request frame to a value in the retaining the total predictive traffic size;
retaining the predictive traffic size corresponding to the received request frame for every flow defined as a combination of the request frame and a response frame corresponding to the request frame; and
acquiring a predictive traffic size, corresponding to the response frame to be transmitted, from the predictive traffic size per flow that is retained in the retaining the predictive traffic size when transmitting the response frame corresponding to the request frame, and subtracting the acquired predictive traffic size from the value in the retaining the total predictive traffic size,
wherein the performing includes comparing the total predictive traffic size with a free area capacity of the retaining the request frame, and adjusting, based on a result of the comparison, transmission timing of the request frame retained in the retaining the request frame, thus performing the traffic rate control.

13. A non-transitory readable-by-computer recording medium recorded with a bandwidth control program making a processing device relaying traffic in a way that receives and transmits frames related to bidirectional flows of traffic, function as:
a response measuring unit measuring a size of a response frame, in reception frames, containing data transmitted from another processing device upon receiving a data transmission request, and calculating, based on the measured size, a predictive traffic size defined as a size of the traffic of the response frames predicted to be received as a response to a request frame defined as another data transmission request to said another processing device;
frame retaining unit retaining the request frame in the reception frames; and a bandwidth control unit performing, based on the predictive traffic size calculated by the response measuring unit, traffic rate control of the request frame and indirect control of a response traffic size by adjusting transmission timing of the request frame retained by the frame retaining unit.

14. A non-transitory readable-by-computer recording medium recorded with a bandwidth control program according to claim 13, further making the processing device function as a traffic rate measuring unit measuring a traffic size of the response frame, and giving an instruction of starting the traffic rate control to the bandwidth control unit when the traffic size exceeds a predetermined value,
wherein the bandwidth control unit starts the traffic rate control upon receiving the instruction of starting the traffic rate control.

15. A non-transitory readable-by-computer recording medium recorded with a bandwidth control program according to claim 14, wherein the frame retaining unit notifies the bandwidth control unit of buffer information defined as information about a size of a frame retained by the frame retaining unit, and
the bandwidth control unit finishes the traffic rate control when the size of the frame retained by the frame retaining unit, which is indicated by the buffer information of which the frame retaining unit has notified, is equal to or smaller than a predetermined threshold value.

16. A non-transitory readable-by-computer recording medium recorded with a bandwidth control program according to claim 15, further making the processing device function as a request identifying unit identifying as to whether the reception frame is the request frame or not, then getting the reception frame retained by the frame retaining unit when the reception frame is the request frame, and transmitting the reception frame without queuing the reception frame retained by the frame retaining unit when the reception frame is not the request frame.

17. A non-transitory readable-by-computer recording medium recorded with a bandwidth control program according to claim 14, further making the processing device function as a control target flow retaining unit retaining, together with flow identifying information, information representing enable or disable of the traffic rate control for every flow defined as a combination of the request frame and a response frame corresponding to the request frame in the reception frames,
wherein the traffic rate measuring unit searches for, based on the flow identifying information, the information representing the enable or disable of the traffic rate control that is retained by the control target flow retaining unit with respect to the flow related to the received frames, and, if the traffic rate control is disabled, does not give the instruction of starting the traffic rate control.

18. A non-transitory readable-by-computer recording medium recorded with a bandwidth control program according to claim 13, further making the processing device function as a buffer monitoring unit monitoring a usage state of the frame retaining unit by periodically acquiring the buffer information defined as the information about the size of a frame retained by the frame retaining unit, and, if the frame size indicated by the buffer information exceeds a predetermined threshold value, instructs the bandwidth control unit to start the traffic rate control.

19. A non-transitory readable-by-computer recording medium recorded with a bandwidth control program according to claim 13, further making the processing device function as a not-yet-respond size retaining unit retaining, in the response frames corresponding to the received request frame, a total predictive traffic size of the not-yet-received response frames;
a predictive traffic size adding unit adding the predictive traffic size corresponding to the received request frame to the not-yet-respond size retaining unit; and
a response traffic size subtracting unit subtracting, when sending the response frame corresponding to the request frame, the traffic size of the response frame from the not-yet-respond size retaining unit,
wherein the bandwidth control unit compares the total predictive traffic size with a free area capacity of the frame retaining unit, and adjusts, based on a result of the comparison, transmission timing of the request frame retained by the frame retaining unit, thus performing the traffic rate control.

20. A non-transitory readable-by-computer recording medium recorded with a bandwidth control program according to claim 13, further making the processing device function as a not-yet-respond size retaining unit retaining, in the response frames corresponding to the received request frame, a total predictive traffic size of the not-yet-received response frames;
a predictive traffic size adding unit adding the predictive traffic size corresponding to the received request frame to the not-yet-respond size retaining unit;
a predictive traffic size retaining unit retaining the predictive traffic size corresponding to the received request frame for every flow defined as a combination of the request frame and a response frame corresponding to the request frame; and
a predictive traffic size subtracting unit acquiring a predictive traffic size, corresponding to the response frame to be transmitted, from the predictive traffic size per flow that is retained by the predictive traffic size retaining unit when transmitting the response frame corresponding to the request frame, and subtracting the acquired predictive traffic size from the not-yet-respond size retaining unit,
wherein the bandwidth control unit compares the total predictive traffic size with a free area capacity of the frame retaining unit, and adjusts, based on a result of the comparison, transmission timing of the request frame retained by the frame retaining unit, thus performing the traffic rate control.

* * * * *